United States Patent
Takata et al.

(10) Patent No.: US 11,656,473 B2
(45) Date of Patent: May 23, 2023

(54) LIGHTGUIDE LIGHTING SYSTEM FOR DISPLAY SYSTEM

(71) Applicant: Panasonic Intellectual Property Management Co., Ltd., Osaka (JP)

(72) Inventors: Kazumasa Takata, Osaka (JP); Masaru Fujita, Osaka (JP); Wahei Agemizu, Osaka (JP); Yosuke Araki, Osaka (JP); Tomohisa Sakaguchi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 17/235,088

(22) Filed: Apr. 20, 2021

(65) Prior Publication Data

US 2021/0356752 A1 Nov. 18, 2021

(30) Foreign Application Priority Data

May 13, 2020 (JP) .............................. JP2020-084813

(51) Int. Cl.
  *G02B 6/00* (2006.01)
  *G02B 27/09* (2006.01)
  (Continued)

(52) U.S. Cl.
  CPC .......... *G02B 27/0972* (2013.01); *B60K 37/02* (2013.01); *G02B 27/0101* (2013.01); *B60K 2370/1529* (2019.05); *B60K 2370/347* (2019.05)

(58) Field of Classification Search
  CPC ............ G02F 1/133615; G02B 6/0036; G02B 6/0035; G09F 13/18; G09F 2013/0027; G09F 2013/0013
  See application file for complete search history.

(56) References Cited

U.S. PATENT DOCUMENTS

| 3,043,947 A | * | 7/1962 | Albinger, Jr. ........ | G02B 6/0028 362/634 |
| 3,241,256 A | * | 3/1966 | Viret ........................ | G09F 9/00 116/286 |

(Continued)

FOREIGN PATENT DOCUMENTS

| JP | 2017-142491 | 8/2017 |
| JP | 2020-183979 | 11/2020 |
| WO | 2020/218375 | 10/2020 |

OTHER PUBLICATIONS

Extended European Search Report dated Sep. 21, 2021 in corresponding European Patent Application No. 21167963.4.

*Primary Examiner* — Ismael Negron
(74) *Attorney, Agent, or Firm* — Wenderoth, Lind & Ponack, L.L.P.

(57) ABSTRACT

An optical system includes a light guide member having a light-incident surface, a first surface, a light-emitting surface facing the first surface, a first end surface, a second end surface, a plurality of collimating lenses disposed on the light-incident surface and being arranged along a first direction, and a plurality of prism pieces. The plurality of prism pieces include two or more prism pieces having different inclination angles with respect to the light-incident surface depending on positions of the prism pieces in at least the first direction, and each of the inclination angles of the two or more prism pieces is an angle formed between the first direction and the longitudinal axis of a corresponding prism piece. Each of the inclination angles of the two or more prism pieces increases as the corresponding prism piece is positioned closer to any of the first end surface or the second end surface.

15 Claims, 16 Drawing Sheets

(51) Int. Cl.
*B60K 37/02* (2006.01)
*G02B 27/01* (2006.01)

(56) References Cited

U.S. PATENT DOCUMENTS

| | | | | |
|---|---|---|---|---|
| 5,005,108 A * | 4/1991 | Pristash | ............... | G02B 6/0061 362/23.15 |
| 5,390,436 A * | 2/1995 | Ashall | .................. | G02B 6/0061 362/618 |
| 6,167,182 A * | 12/2000 | Shinohara | ............ | G02B 6/0046 385/129 |
| 6,671,013 B1 * | 12/2003 | Ohkawa | ................ | G02B 6/0061 349/63 |
| 6,712,481 B2 * | 3/2004 | Parker | .................. | G02B 6/0061 362/330 |
| 7,108,414 B2 * | 9/2006 | McCollum | ........... | G02B 6/0018 40/577 |
| 8,002,455 B2 * | 8/2011 | Lai | .......................... | G09F 13/18 362/626 |
| 8,262,274 B2 * | 9/2012 | Kim | ..................... | G02B 6/0065 362/625 |
| 8,690,413 B2 * | 4/2014 | Kamikatano | ........... | G09F 13/02 362/606 |
| 10,775,544 B2 * | 9/2020 | Osumi | ................. | G02B 6/0058 |
| 2011/0019258 A1 | 1/2011 | Levola | | |
| 2012/0051088 A1 * | 3/2012 | Chui | ...................... | G02B 6/006 362/608 |
| 2017/0230628 A1 | 8/2017 | Ichikawa et al. | | |
| 2019/0101759 A1 | 4/2019 | Usukura et al. | | |

* cited by examiner

FIG. 7A
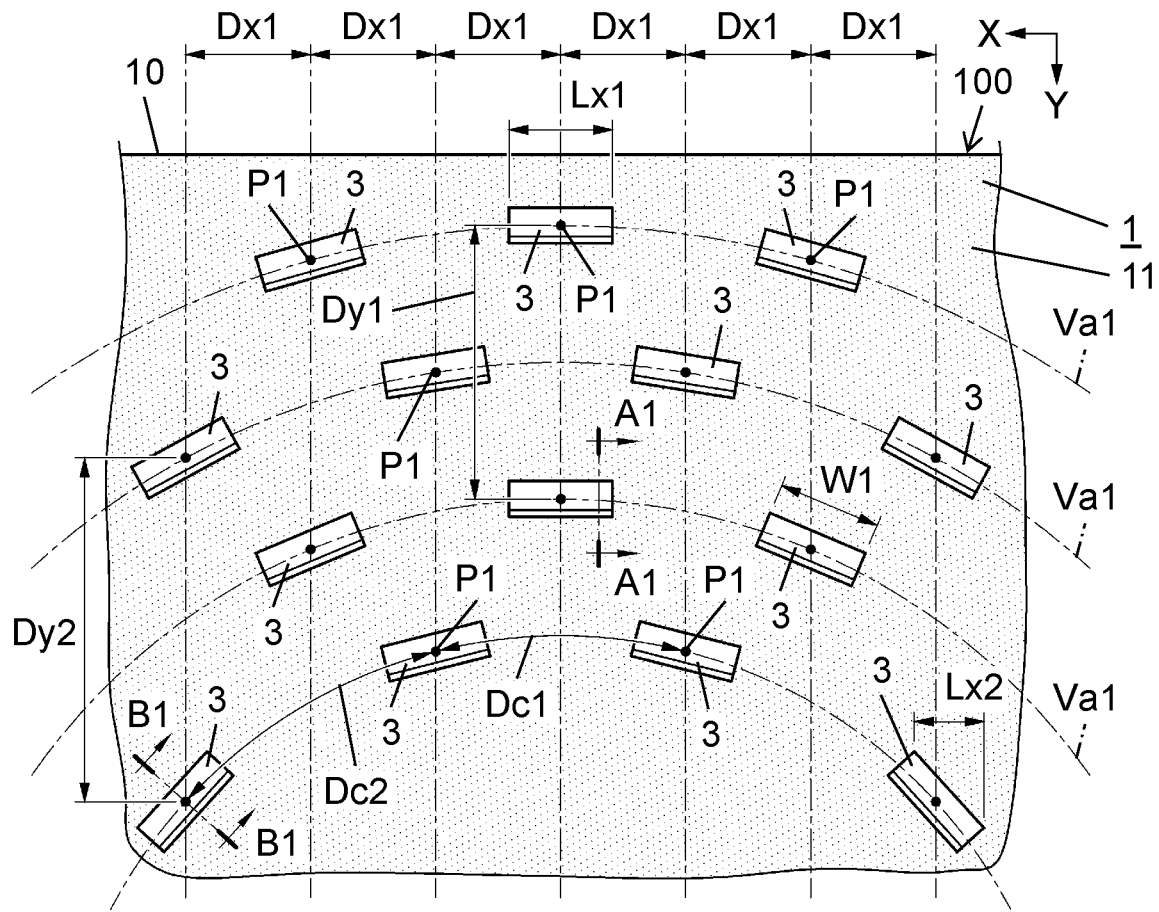
FIG. 7B
FIG. 7C
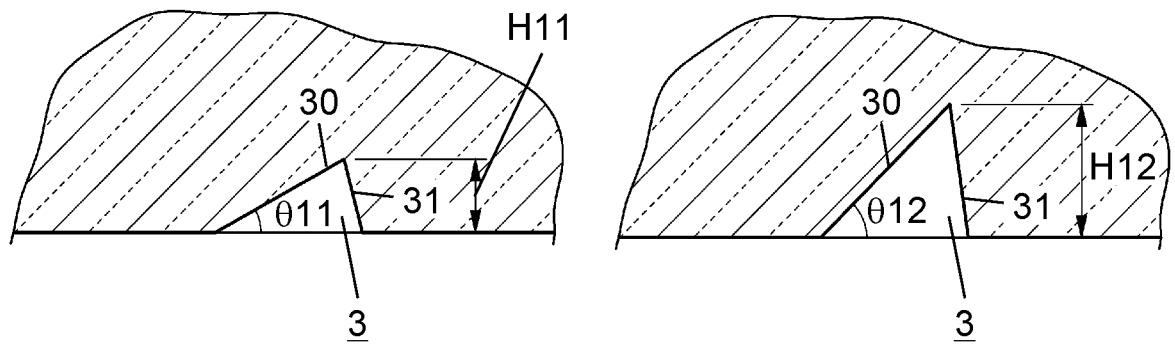

LIGHTGUIDE LIGHTING SYSTEM FOR DISPLAY SYSTEM

BACKGROUND

1. Technical Field

The present disclosure generally relates to an optical system, a lighting system, a display system, and a moving object. More specifically, the present disclosure relates to an optical system, a lighting system, a display system, and a moving object that control light incident from an incident surface and emit the light from an emitting surface.

2. Description of the Related Art

Japanese Unexamined Patent Publication No. 2017-142491 discloses an image display device (display system) that projects a virtual image into a target space. This image display device is a vehicle HUD (Head-Up Display) device. The projected light, which is the image light emitted from the vehicle HUD device (optical system) in a dashboard, is reflected by a windshield and directed toward a driver who is the viewer. As a result, the user (driver) can visually recognize an image such as a navigation image as a virtual image to visually recognize the virtual image as if the virtual image is superimposed on the background such as a road surface.

SUMMARY

An optical system according to one aspect of the present disclosure includes a light guide member that has an incident surface on which light is incident, and a first surface and a second surface facing each other, the second surface being a light-emitting surface from which the light emits; and a plurality of prism pieces that are provided on the first surface and reflect, toward the second surface, of the light emitted from the second surface of the light guide member, wherein the plurality of prism pieces include two or more prism pieces having different inclination angles with respect to the incident surface depending on positions in at least a first direction along both the incident surface and the first surface, and each of the inclination angles of the two or more prism pieces is an angle formed between the first direction and a reference light beam, and each of the inclination angles causes a corresponding prism piece of the two or more prism pieces to reflect the light emitted from the second surface towards more outside or more inside of the light guide member as the corresponding prism piece is positioned closer to any of both ends of the first surface along the first direction.

BRIEF DESCRIPTION OF THE DRAWINGS

FIG. 7A is a schematic plan view of enlarged area A1 of FIG. 2C;

FIG. 7B is a cross-sectional view taken along line A1-A1 of FIG. 7A;

FIG. 7C is a cross-sectional view taken along line B1-B1 of FIG. 7A;

DETAILED DESCRIPTIONS

Exemplary Embodiment 1

(1) Overview

First, an outline of optical system 100 according to the present exemplary embodiment and lighting system 200 using optical system 100 will be described with reference to FIGS. 1A to 3B.

Figure 1A:
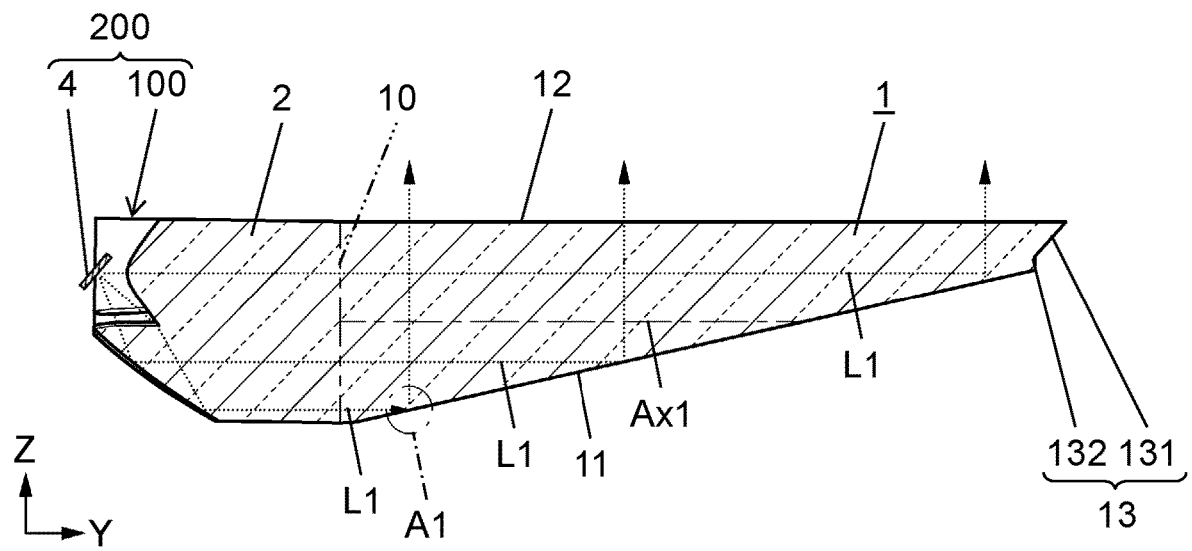
FIG. 1A is a cross-sectional view illustrating an outline of an optical system according to Exemplary Embodiment 1.
Figure 1B:
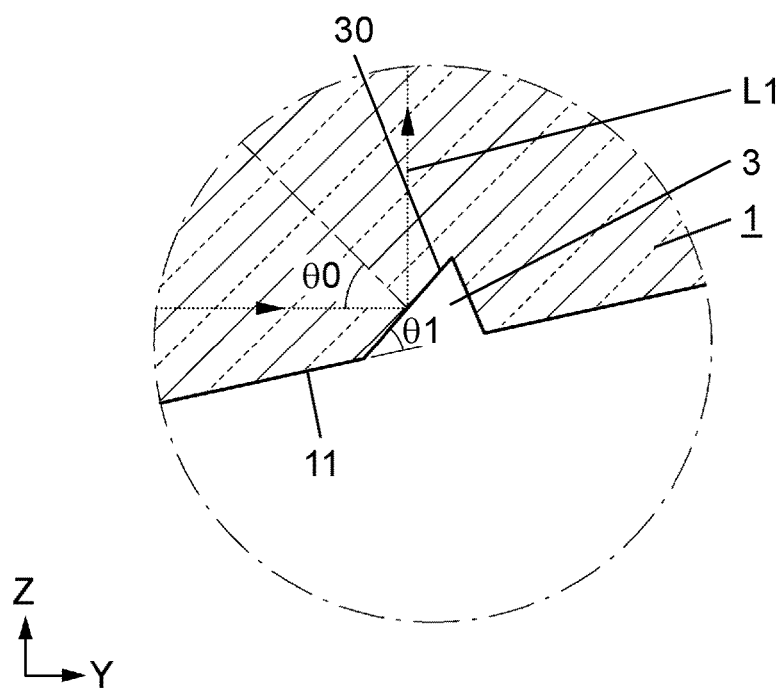
FIG. 1B is a schematic view of enlarged area A1 of FIG. 1A.
Figure 2A:
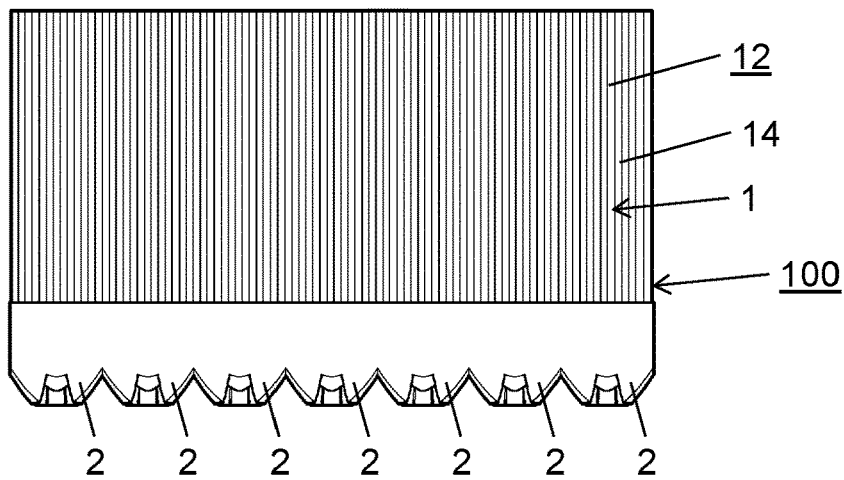
FIG. 2A is a plan view of the same optical system.
Figure 2B:
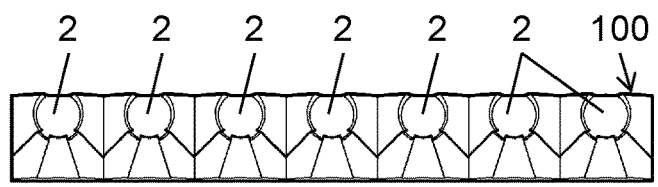
FIG. 2B is a front view of the same optical system.
Figure 2D:
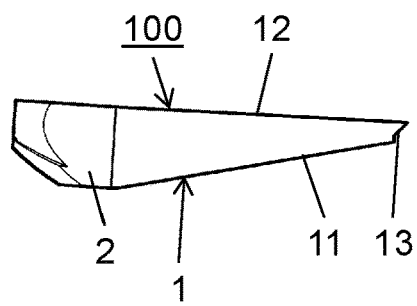
FIG. 2D is a side view of the same optical system.
Figure 2C:
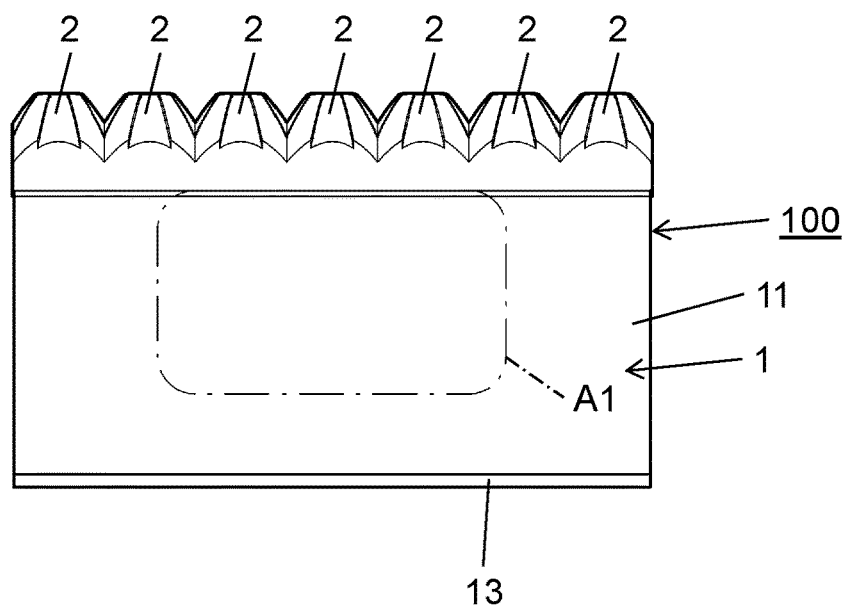
FIG. 2C is a bottom view of the same optical system.

Optical system 100 (see FIGS. 1A and 1B) according to the present exemplary embodiment has a function of controlling the light incident from incident surface 10 and emitting the light from the emitting surface (second surface 12). As illustrated in FIGS. 1A and 1B, optical system 100 includes light guide member 1 and a plurality of prism pieces 3.

Optical system 100 constitutes lighting system 200 together with light source 4. In other words, lighting system 200 according to the present exemplary embodiment includes optical system 100 and light source 4. Light source 4 outputs light incident on incident surface 10. As will be described in detail later, when optical system 100 includes light controller 2, the light from light source 4 does not directly enter light guide member 1, but enters light guide member 1 through light controller 2. That is, light source 4 emits light to incident surface 10 (of light guide member 1) through light controller 2.

As described above, in the present exemplary embodiment, optical system 100 further includes light controller 2 in addition to light guide member 1 and the plurality of prism pieces 3. Light controller 2 is positioned between light source 4 and incident surface 10 of light guide member 1 and controls the light output from light source 4 and incident on incident surface 10. In particular, in the present exemplary embodiment, light guide member 1 and light controller 2 are integrated as an integrally molded product. That is, in the present exemplary embodiment, light guide member 1 and light controller 2 are an integrally molded product and are inseparably integrated. In other words, light controller 2 is seamlessly continuous with respect to incident surface 10 of light guide member 1, and light guide member 1 and light controller 2 are seamlessly integrated. Therefore, in the present exemplary embodiment, incident surface 10 of light guide member 1 is a "virtual surface" defined inside the integrally molded product of light guide member 1 and light controller 2, and is not accompanied by an entity.

In the present exemplary embodiment, light guide member 1 has incident surface 10 on which light is incident, and first surface 11 and second surface 12 facing each other. Second surface 12 is a light-emitting surface. The plurality of prism pieces 3 are provided on first surface 11. The plurality of prism pieces 3 reflect the light passing through the inside of light guide member 1 toward second surface 12.

Light guide member 1 includes direct optical path L1 (see FIGS. 1A and 1B). Direct optical path L1 is an optical path in which light incident from incident surface 10 is directly reflected by any one of the plurality of prism pieces 3 and emitted from second surface 12. Furthermore, light guide member 1 includes an optical path (direct optical path L1) in which the light incident on light guide member 1 from incident surface 10 is emitted from second surface 12 inside light guide member 1 after being reflected only once by any one of prism pieces 3. When the light passing through direct optical path L1 is incident on light guide member 1 from incident surface 10, the light reaches second surface 12 after being reflected only once by prism pieces 3 without being reflected by other than prism piece 3 and is emitted from second surface 12 to the outside of light guide member 1 as it is.

In the present exemplary embodiment, most of the light incident on light guide member 1 from incident surface 10 and emitted from second surface 12 is guided inside light guide member 1 through direct optical path L1. Therefore, in the present exemplary embodiment, most of the light incident on light guide member 1 from incident surface 10 is reflected only once by prism pieces 3 without being reflected by other than prism pieces 3, and therefore is emitted from second surface 12 to the outside of light guide member 1. As a result, optical system 100 can improve the efficiency of light extraction.

By the way, as illustrated in FIGS. 1A and 1B, optical system 100 according to the present exemplary embodiment includes light guide member 1 and a plurality of prism pieces 3. As described above, light guide member 1 has incident surface 10 on which light is incident, and first surface 11 and second surface 12 facing each other. Second surface 12 is a light-emitting surface. The plurality of prism pieces 3 are provided on first surface 11. The plurality of prism pieces 3 reflect the light passing through the inside of light guide member 1 toward second surface 12. As illustrated in FIGS. 6A to 6D, the plurality of prism pieces 3 include two or more prism pieces 3 having different inclination angles θ10 with respect to incident surface 10 depending on the position in at least the first direction (X-axis direction) along both incident surface 10 and first surface 11. Inclination angles θ10 of two or more prism pieces 3 are determined so that the light emitted from second surface 12 is directed to the outside or the inside in the first direction with respect to reference light beam L100 as prism piece 3 is positioned closer to both ends of first surface 11 in the first direction.

According to this aspect, the light incident from incident surface 10 passes through the inside of light guide member 1, is reflected by the plurality of prism pieces 3 provided on first surface 11 of light guide member 1, and is emitted from second surface 12 as an emitting surface of light guide member 1. Two or more of the plurality of prism pieces 3 have different inclination angles θ10 with respect to incident surface 10 depending on the position at least in the first direction (X-axis direction), and the direction of the light emitted from second surface 12 is controlled by inclination angle θ10. Inclination angle θ10 is determined so that the light emitted from second surface 12 is directed to the outside or the inside in first direction with respect to reference light beam L100 as prism piece 3 is positioned closer to both ends in the first direction of first surface 11. Therefore, the light emitted from second surface 12 as an emitting surface is not emitted in a uniform direction from the entire area of second surface 12, but is emitted toward the outside or the inside with respect to reference light beam L100 at least at the prism piece positioned closer to both ends of second surface 12 in the first direction. As a result, according to optical system 100 according to the present exemplary embodiment, there is an advantage that the brightness distribution on second surface 12 as an emitting surface can be adjusted by inclination angles θ10 of the plurality of prism pieces 3, and a desired brightness distribution can be easily realized.

(2) Details

Hereinafter, optical system 100, lighting system 200 using optical system 100, display system 300 using lighting system 200, and moving object B1 according to the present exemplary embodiment will be described in detail with reference to FIGS. 1A to 7C.

(2.1) Premise

In the following description, it is assumed that the width direction of light guide member 1 (the direction in which a plurality of light sources 4 are arranged in FIG. 3A) is an "X-axis direction", and the depth direction of light guide member 1 (the direction in which optical axis Ax1 extends in FIG. 1A) is a "Y-axis direction". Further, in the following description, it is assumed that the thickness direction of light guide member 1 (the direction in which first surface 11 and second surface 12 are arranged in FIG. 1A) is a "Z-axis direction". The X-axis, Y-axis, and Z-axis that define these directions are orthogonal to each other. The arrows indicating the "X-axis direction", "Y-axis direction", and "Z-axis direction" in the drawings are illustrated for explanation purposes only and are not accompanied by an entity. The X-axis direction corresponds to a "first direction" because the X-axis direction is a direction along both incident surface 10 and first surface 11. Further, the Y-axis direction corresponds to a "second direction" because the Y-axis direction is a direction orthogonal to the first direction (X-axis direction) in second surface 12.

Further, the term "efficiency of extraction" as used in the present disclosure refers to the ratio of the amount of light emitted from second surface 12 (emitting surface) of light guide member 1 to the amount of light incident on incident surface 10 of light guide member 1. That is, if the relative ratio of the amount of light emitted from second surface 12 of light guide member 1 to the amount of light incident on incident surface 10 of light guide member 1 becomes large, the efficiency of light extraction is high (large). As an example, if the amount of light incident on incident surface 10 of light guide member 1 is "100" whereas the amount of light emitted from second surface 12 of light guide member 1 is "10", the efficiency of light extraction of light guide member 1 is 10%.

The term "optical axis" as used in the present disclosure means a virtual light beam which is a representative of a luminous flux passing through the entire system. As an example, the optical axis of light source 4 coincides with the axis of rotational symmetry of the light emitted from light source 4.

The term "parallel" as used in the present disclosure means that two substances are substantially parallel, that is, in addition to the case where the two are strictly parallel, the angle between the two is within a range of several degrees (for example, less than 5 degrees).

The term "orthogonal" as used in the present disclosure means that two substances are substantially orthogonal to each other, that is, in addition to the case where the two are strictly orthogonal to each other, the angle between the two is within a range of several degrees (for example, less than 5 degrees) based on 90 degrees.

(2.2) Display System

First, display system 300 and moving object B1 according to the present exemplary embodiment will be described with reference to FIGS. 4 and 5.

Figure 4:
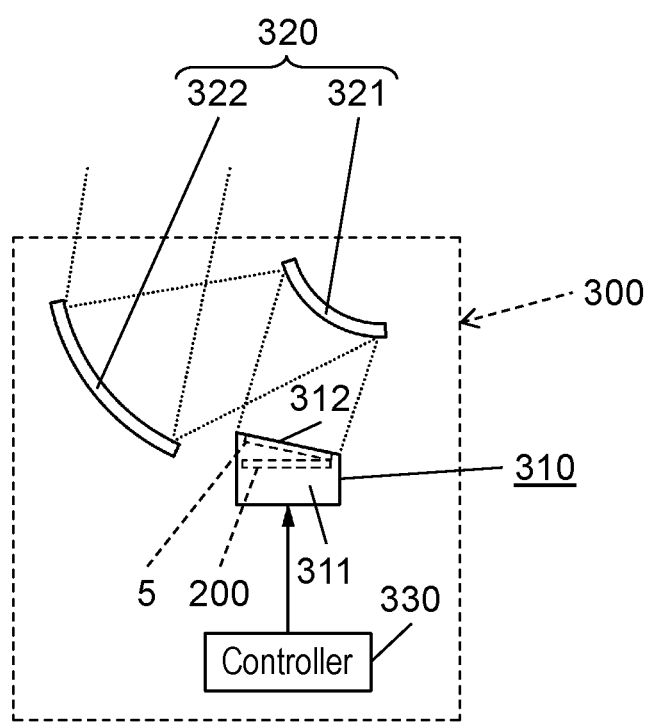
FIG. 4 is an explanatory view of a display system using the same optical system.

As illustrated in FIG. 4, lighting system 200 according to the present exemplary embodiment constitutes display system 300 together with display device 5. In other words, display system 300 according to the present exemplary embodiment includes lighting system 200 and display device 5. Display device 5 receives the light emitted from lighting system 200 and displays an image. The "image" referred to here is an image displayed in a manner that is visible to user U1 (see FIG. 5) and may be a figure, a symbol, a character, a number, a pattern, a photograph, or a combination thereof. The image displayed by display system 300 includes a moving image and a still image. Further, the "moving image" includes an image composed of a plurality of still images obtained by time-lapse photography or the like.

Figure 5:
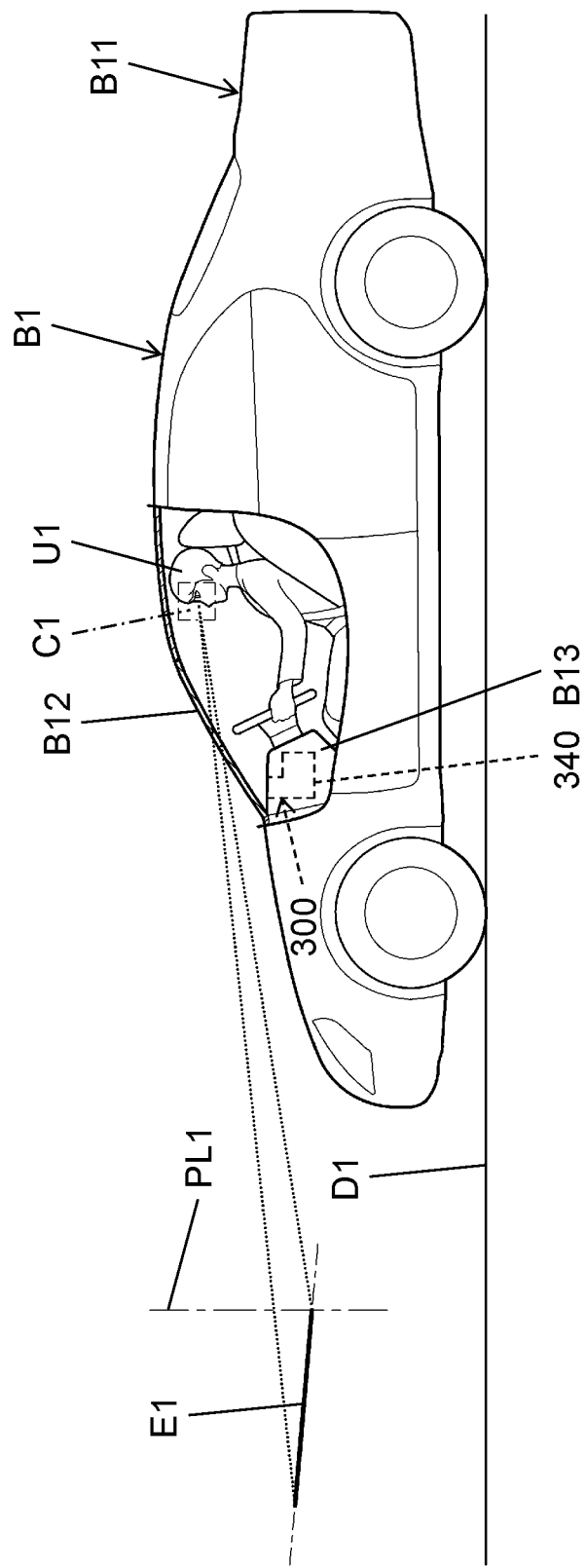
FIG. 5 is an explanatory view of a moving object including the same display system.

As illustrated in FIG. 5, display system 300 according to the present exemplary embodiment constitutes moving object B1 such as a vehicle together with moving object body B11. In other words, moving object B1 according to the present exemplary embodiment includes display system 300 and moving object body B11. Moving object body B11 is equipped with display system 300. In the present exemplary embodiment, as an example, moving object B1 is a vehicle (passenger car) driven by a person. In this case, user U1 who visually recognizes the image displayed by display system 300 is an occupant of moving object B1, and in the present exemplary embodiment, as an example, the driver of the vehicle as moving object B1 is assumed to be user U1.

In the present exemplary embodiment, display system 300 is used, for example, as a head-up display (HUD) mounted on moving object B1. Display system 300 is used, for example, to display driving support information related to speed information, condition information, driving information, and the like of moving object B1 in the field of view of user U1. The driving information of moving object B1 includes, for example, navigation-related information that displays a traveling route and the like, and ACC (Adaptive Cruise Control)-related information that keeps the traveling speed and the inter-vehicle distance constant.

As illustrated in FIGS. 4 and 5, display system 300 includes image display unit 310, optical system 320, and a controller 330. In addition, display system 300 further includes housing 340 that accommodates image display unit 310, optical system 320, and controller 330.

Housing 340 is made of, for example, a molded product of synthetic resin. Housing 340 accommodates image display unit 310, optical system 320, controller 330, and the like. Housing 340 is attached to dashboard B13 of moving object body B11. The light reflected by second mirror 322 (described later) of optical system 320 is emitted to the reflective member (windshield B12) through the opening on the upper surface of housing 340, and the light reflected by windshield B12 is focused on eyebox C1. The reflective member is not limited to windshield B12, but may be realized by, for example, a combiner disposed on dashboard B13 of moving object body B11.

According to such display system 300, user U1 visually recognizes the virtual image projected in the space in front of moving object B1 (outside the vehicle) through windshield B12. The term "virtual image" as used in the present disclosure means an image in which when the light emitted from display system 300 is diverged by a reflective member such as windshield B12, the diverged light beams actually form an object. Therefore, user U1 who is driving moving object B1 visually recognizes an image as a virtual image projected by display system 300 by being superimposed on the real space spreading in front of moving object B1. In short, display system 300 according to the present exemplary embodiment displays a virtual image as an image. The image (virtual image) that can be displayed by display system 300 includes virtual image E1 superimposed along traveling surface D1 of moving object B1 and a virtual image three-dimensionally drawn along plane PL1 orthogonal to traveling surface D1.

Image display unit 310 includes display device 5 and lighting system 200 including optical system 100. Display device 5 is, for example, a liquid crystal display or the like and displays an image by receiving light emitted from lighting system 200. That is, lighting system 200 emits light from behind display device 5 toward display device 5, and the light from lighting system 200 passes through display device 5, and therefore display device 5 displays an image. In other words, lighting system 200 functions as a backlight for display device 5.

Image display unit 310 includes case 311. Case 311 accommodates lighting system 200 including optical system 100 and light source 4, and display device 5. Lighting system 200 and display device 5 are held in case 311. Display device 5 is disposed along the upper surface of case 311 so that one surface of display device 5 is exposed from the upper surface of case 311. Lighting system 200 is disposed below display device 5 in case 311 and outputs light from below display device 5 toward display device 5. As a result, the upper surface of case 311 constitutes display surface 312 on which an image is displayed.

Image display unit 310 is accommodated inside housing 340 with display surface 312 facing first mirror 321 (described later). Display surface 312 of image display unit 310 has a shape (for example, a rectangular shape) that matches the range of the image projected on user U1, that is, the shape of windshield B12. A plurality of pixels are disposed in an array on display surface 312 of image display unit 310. The plurality of pixels of image display unit 310 emit light according to the control of controller 330, and an image is displayed on display surface 312 by the light output from display surface 312 of image display unit 310.

The image displayed on display surface 312 of image display unit 310 is emitted to windshield B12, and the light reflected by windshield B12 is focused on eyebox C1. That is, the image displayed on display surface 312 is visually recognized by user U1 who has a viewpoint in eyebox C1 through optical system 320. At this time, user U1 visually recognizes the virtual image projected on the space in front of moving object B1 (outside the vehicle) through windshield B12.

Optical system 320 collects the light output from display surface 312 of image display unit 310 on eyebox C1. In the present exemplary embodiment, optical system 320 includes, for example, first mirror 321 which is a convex mirror, second mirror 322 which is a concave mirror, and windshield B12.

First mirror 321 reflects the light output from image display unit 310 and makes the light enter second mirror 322. Second mirror 322 reflects the light incident from first mirror 321 toward windshield B12. Windshield B12 reflects the light incident from second mirror 322 and makes the light enter eyebox C1.

Controller 330 receives detection signals from various sensors mounted on moving object body B11, for example. Based on the detection signals input from the sensors, image data for displaying the virtual image to be displayed is generated. Controller 330 outputs the generated image data to image display unit 310, and causes display surface 312 of image display unit 310 to display an image based on the image data. The image displayed on display surface 312 is projected onto windshield B12, and therefore display system 300 displays the image (virtual image). In this way, the image (virtual image) displayed by display system 300 is visually recognized by user U1.

(2.3) Optical System

Next, optical system 100 will be described with reference to FIGS. 1A to 3B and 6A to 6D.

As described above, optical system 100 includes light guide member 1 and plurality of prism pieces 3. In the present exemplary embodiment, optical system 100 includes a plurality of light controllers 2 in addition to light guide member 1 and the plurality of prism pieces 3. That is, optical system 100 according to the present exemplary embodiment includes light guide member 1, a plurality of light controllers 2, and a plurality of prism pieces 3.

In the present exemplary embodiment, optical system 100 constitutes lighting system 200 together with the plurality of light sources 4. That is, lighting system 200 according to the present exemplary embodiment includes optical system 100 and a plurality of light sources 4. Therefore, light from the plurality of light sources 4 arranged in the first direction (X-axis direction) is incident on incident surface 10 of optical system 100. As an example in the present exemplary embodiment, lighting system 200 includes seven light sources 4, and light from these seven light sources 4 is incident on incident surface 10.

Since the plurality of light controllers 2 share a common configuration, the configuration described below for one light controller 2 is the same for the other light controllers 2 unless otherwise specified. Since the plurality of light sources 4 share a common configuration, the configuration described below for one light source 4 is the same for the other light sources 4 unless otherwise specified. Since the plurality of prism pieces 3 basically share the same configuration, the configuration described below for one prism piece 3 is the same for the other prism pieces 3 unless otherwise specified.

Light source 4 is, for example, a solid-state light emitting element such as a light emitting diode (LED) element or an organic electro-luminescence (OEL) element. As an example in the present exemplary embodiment, light source 4 is a chip-shaped light-emitting diode element. In reality, such light source 4 emits light on a surface (light-emitting surface) with a certain area, but ideally, can be regarded as a point light source that emits light from one point on the surface. Therefore, in the following description, it is assumed that light source 4 is an ideal point light source.

In the present exemplary embodiment, as illustrated in FIG. 1A, light source 4 is disposed so as to face incident surface 10 of light guide member 1 at a predetermined interval. Light controller 2 is positioned between light source 4 and incident surface 10 of light guide member 1.

In the present exemplary embodiment, light controller 2 is integrated with light guide member 1. The term "integral" as used in the present disclosure means that a plurality of elements (parts) can be physically treated as one. That is, the fact that a plurality of elements are integrated means that the plurality of elements are grouped together and can be treated as one member. In this case, the plurality of elements may be integrally inseparable like an integrally molded product, or the plurality of separately created elements may be mechanically bonded, for example, by welding, bonding, caulking, or the like. That is, it suffices that light guide member 1 and light controller 2 are integrated in an appropriate manner.

More specifically, in the present exemplary embodiment, as described above, light guide member 1 and light controller 2 are integrated as an integrally molded product. That is, in the present exemplary embodiment, light guide member 1 and light controller 2 are an integrally molded product and are inseparably integrated. Therefore, as described above, incident surface 10 of light guide member 1 is a "virtual surface" defined inside the integrally molded product of light guide member 1 and light controller 2, and is not accompanied by an entity.

Figure 3A:
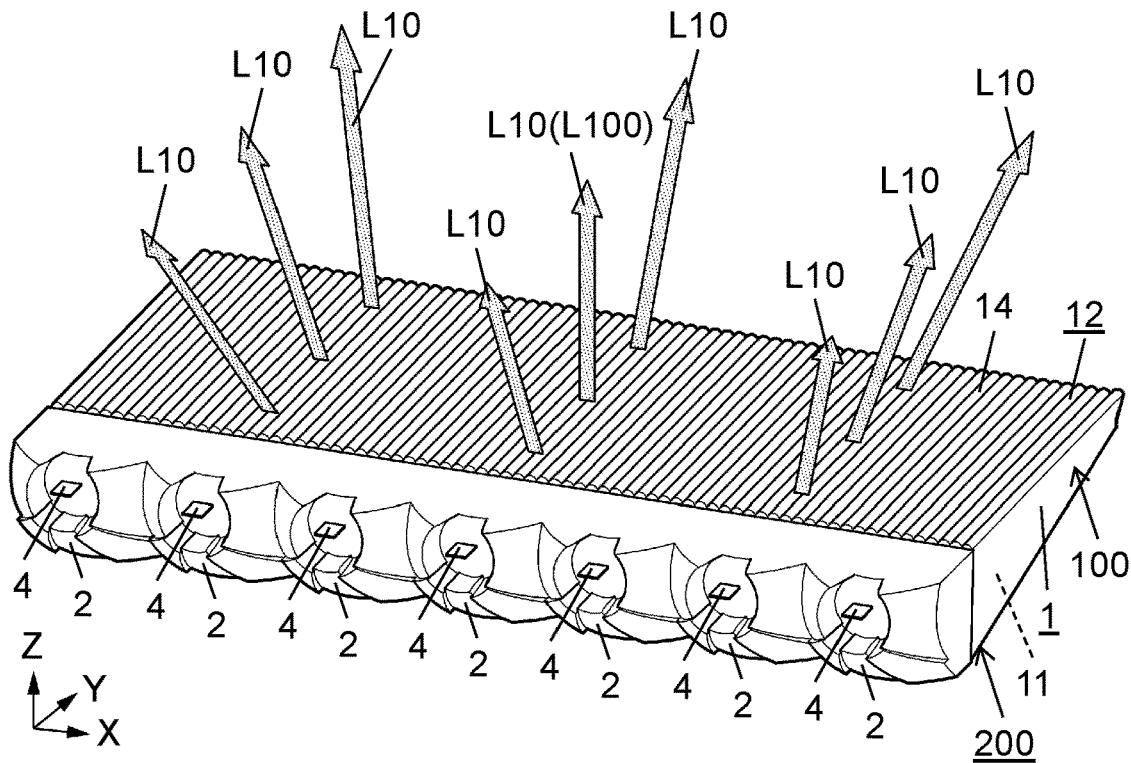
FIG. 3A is a perspective view illustrating an outline of the same optical system.

As illustrated in FIG. 3A, the plurality of light sources 4 are disposed so as to be arranged at a predetermined interval in the X-axis direction. The plurality of light sources 4 have a one-to-one correspondence with the plurality of light controllers 2. That is, the plurality of light controllers 2 are also disposed so as to be arranged in the X-axis direction, similarly to the plurality of light sources 4. The pitches of the plurality of light sources 4 in the X-axis direction are equal to the pitches of the plurality of light controllers 2.

Light guide member 1 is a member that takes in light from light source 4 into light guide member 1 from incident surface 10 and guides the light through light guide member 1 to second surface 12 which is an emitting surface, that is, guides the light. As an example in the present exemplary embodiment, light guide member 1 is a molded product of a light-transmitting resin material such as acrylic resin, and is formed in a plate shape. That is, light guide member 1 is a light guide plate having a certain thickness.

As described above, light guide member 1 has an incident surface 10 on which light is incident, and first surface 11 and second surface 12 (emitting surface) facing each other. Further, light guide member 1 has end surface 13 (see FIG. 1A) facing incident surface 10.

Specifically, in the present exemplary embodiment, as illustrated in FIGS. 2A to 2D, light guide member 1 has a rectangular plate shape, and two surfaces facing each other in the thickness direction of light guide member 1 are first surfaces 11 and second surface 12, respectively. Further, one end surface of the four end surfaces (peripheral surfaces) of light guide member 1 is incident surface 10. That is, light guide member 1 is formed in a rectangular shape in a plan view (viewed from one side in the Z-axis direction). As an example, light guide member 1 is formed in a rectangular shape having a smaller dimension in the Y-axis direction than in the X-axis direction. Both surfaces of light guide member 1 in the thickness direction (Z-axis direction) form first surface 11 and second surface 12, respectively. Both surfaces of light guide member 1 in the lateral direction (Y-axis direction) form incident surface 10 and end surface 13, respectively.

In the present exemplary embodiment, end surface 13 is divided into inclined surface 131 and vertical surface 132 in the Z-axis direction. Inclined surface 131 is a plane that is inclined with respect to incident surface 10 so that the distance from incident surface 10 in the Y-axis direction is larger on second surface 12 side than on first surface 11 side. On the other hand, vertical surface 132 is a plane parallel to incident surface 10. Inclined surface 131 is adjacent to second surface 12, and vertical surface 132 is adjacent to first surface 11.

As described above, one end surface (left surface in FIG. 1A) of the two end surfaces facing each other in the Y-axis direction of light guide member 1 is incident surface 10 in which light emitted from the plurality of light sources 4 is incident through the plurality of light controllers 2. The two surfaces of light guide member 1 facing each other in the Z-axis direction are first surface 11 and second surface 12, respectively. First surface 11 is the lower surface in FIG. 1A, and second surface 12 is the upper surface in FIG. 1A.

Second surface 12 is an emitting surface that emits light from the inside of light guide member 1 to the outside. Therefore, in light guide member 1, when light is incident from one end surface which is incident surface 10, second surface 12 which is the emitting surface emits light.

In the present exemplary embodiment, second surface 12 is a plane parallel to an X-Y plane. Incident surface 10 is a plane parallel to the X-Z plane. The "X-Y plane" referred to here is a plane including the X-axis and the Y-axis, and is a plane orthogonal to the Z-axis. Similarly, the "X-Z plane" referred to here is a plane including the X-axis and the Z-axis and is a plane orthogonal to the Y-axis. In other words, second surface 12 is a plane orthogonal to the Z axis, and incident surface 10 is a plane orthogonal to the Y axis. Therefore, second surface 12 and incident surface 10 are orthogonal to each other.

On the other hand, first surface 11 is not parallel to the X-Y plane, but is a plane inclined with respect to the X-Y plane. That is, first surface 11 and incident surface 10 are not orthogonal to each other. Specifically, first surface 11 is inclined with respect to the X-Y plane so as to approach second surface 12 as the distance from incident surface 10 increases. That is, in the present exemplary embodiment, first surface 11 and second surface 12 are inclined to each other.

In the present exemplary embodiment, light distribution controller 14 is provided on second surface 12. Light distribution controller 14 controls the light distribution of the light extracted from second surface 12 which is the emitting surface. Light distribution controller 14 includes a lens. As an example in the present exemplary embodiment, light distribution controller 14 includes a multi-lens, that is, a so-called cylindrical lens, which is composed of a group of a plurality of semi-cylindrical small lenses arranged in the X-axis direction. In the present exemplary embodiment, light distribution controller 14 is integrated with light guide member 1 as an integrally molded product. That is, in the present exemplary embodiment, light guide member 1 and light distribution controller 14 are an integrally molded product and are in an integrally inseparable relationship.

Light controller 2 is disposed between light source 4 and incident surface 10 of light guide member 1. Light controller 2 controls the light output from light source 4 and incident on incident surface 10. In the present exemplary embodiment, light controller 2 has a collimating function of bringing the light output from light source 4 closer to parallel light. That is, light controller 2 is a collimating lens that brings light closer to parallel light by condensing the light toward incident surface 10 when light that spreads radially from light source 4 is incident. The light emitted from light source 4 enters incident surface 10 of light guide member 1 through light controller 2. Therefore, the light from light source 4 is controlled by light controller 2 having a collimating function so as to narrow the spreading angle and is emitted toward incident surface 10 of light guide member 1. In the present exemplary embodiment, it is assumed that the light from light source 4 as an ideal point light source is controlled by light controller 2 to the ideal parallel light.

In the present exemplary embodiment, as illustrated in FIG. 1A, optical axis Ax1 of the light incident from incident surface 10 of light guide member 1 is inclined with respect to first surface 11 so that the distance to first surface 11 decreases as the distance from incident surface 10 increases. Therefore, the parallel light emitted from light controller 2 to incident surface 10 of light guide member 1 becomes parallel light inclined with respect to first surface 11 so that the distance to first surface 11 decreases as the distance from incident surface 10 increases. In addition, the dotted arrow in the drawing conceptually represents a light beam (or an optical path) and is not accompanied by an entity.

In the present exemplary embodiment, as illustrated in FIG. 3A, the plurality of light controllers 2 are formed so as to be aligned in the X-axis direction at the end portions forming incident surface 10 of light guide member 1. That is, in the present exemplary embodiment, light controller 2 is integrated with light guide member 1. As described above, the plurality of light controllers 2 each have a one-to-one correspondence with the plurality of light sources 4. Therefore, the plurality of light controllers 2 control the spread angle of the light emitted by corresponding light sources 4 and emit the light to incident surface 10.

The plurality of prism pieces 3 are provided on first surface 11 and reflect the light passing through the inside of light guide member 1 toward second surface 12. Each of the plurality of prism pieces 3 is configured to totally reflect the incident light. Of course, each of the plurality of prism pieces 3 is not limited to an aspect in which all the incident light is totally reflected, but may include an aspect in which a part of the light passes through the inside of prism pieces 3 without being totally reflected.

In light guide member 1, most of the light incident from incident surface 10 is emitted from second surface 12 by being reflected by any one of the plurality of prism pieces 3 without being reflected by the portion of first surface 11 or second surface 12 excluding the plurality of prism pieces 3. That is, light guide member 1 includes direct optical path L1 in which light incident from incident surface 10 is directly reflected by any one of the plurality of prism pieces 3 and emitted from second surface 12.

In the present exemplary embodiment, each of the plurality of prism pieces 3 has a predetermined length and is formed on first surface 11 so that the cross section viewed from one side in the longitudinal direction thereof becomes a triangular recess. In other words, each of the plurality of prism pieces 3 is formed in a triangular columnar shape. Prism piece 3 is formed by, for example, processing first surface 11 surface of light guide member 1. As illustrated in FIG. 1B, prism piece 3 has reflective surface 30 that reflects light incident on the inside of light guide member 1 toward second surface 12. FIG. 1B is a schematic end surface view of enlarged area A1 of FIG. 1A.

Figure 6A:
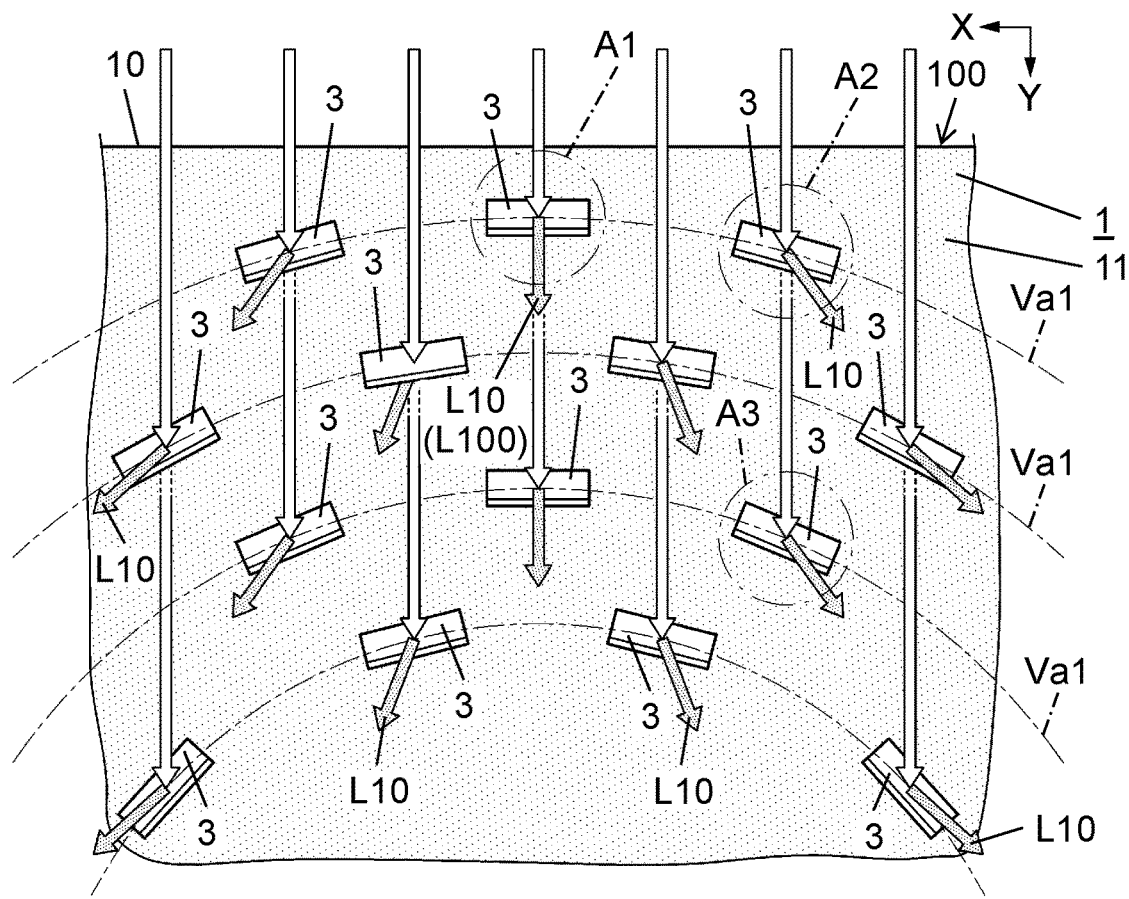
FIG. 6A is a schematic plan view of enlarged area A1 of FIG. 2C.
Figure 6B:
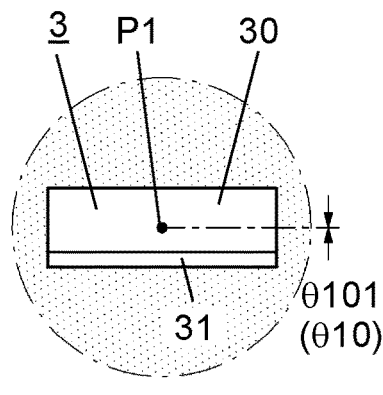
FIG. 6B is a schematic plan view of enlarged area A1 of FIG. 6A.
Figure 6C:
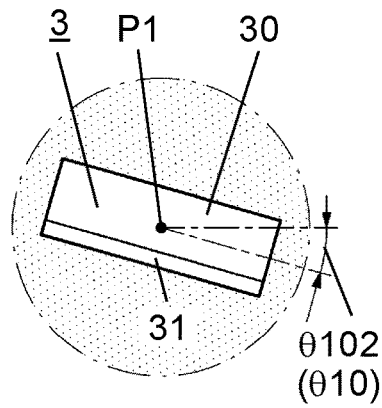
FIG. 6C is a schematic plan view of enlarged area A2 of FIG. 6A.
Figure 6D:
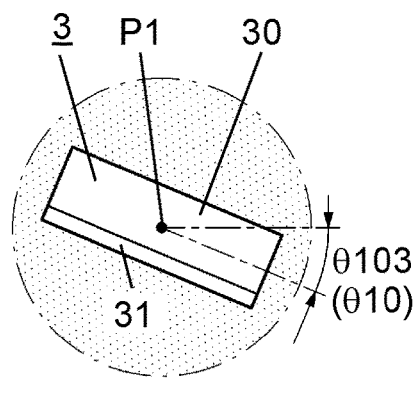
FIG. 6D is a schematic plan view of enlarged area A3 of FIG. 6A.

Angle θ1 formed by reflective surface 30 and first surface 11 (that is, the inclination angle of reflective surface 30) is an angle such that incident angle θ0 of the light incident on reflective surface 30 is equal to or greater than a critical angle. That is, reflective surface 30 is inclined with respect to first surface 11 so that the incident light is totally reflected. In the present exemplary embodiment, as illustrated in FIG. 6A, the plurality of prism pieces 3 are disposed so as to be substantially staggered (zigzag pattern) on first surface 11 when viewed from one side in the Z-axis direction. FIG. 6A is a schematic plan view of enlarged area A1 of FIG. 2C. FIGS. 6B, 6C and 6D are schematic plan views of enlarged areas A1, A2 and A3 of FIG. 6A, respectively.

By the way, in optical system 100 according to the present exemplary embodiment, as described above, two or more prism pieces 3 out of the plurality of prism pieces 3 have different inclination angles θ10 with respect to incident surface 10 depending on the position at least in the first direction (X-axis direction). Inclination angles θ10 are determined so that the light emitted from second surface 12 is directed to the outside in the first direction with respect to reference light beam L100 as two or more prism pieces 3 among the plurality of prism pieces 3 are positioned closer to both ends of first surface 11 in the first direction, that is, closer to the outside in the X-axis direction. Basically, as illustrated in FIGS. 6A to 6D, as the plurality of prism pieces 3 are positioned closer to both ends in the first direction of first surface 11, that is, closer to the outside in the X-axis direction, inclination angle θ10 of prism piece 3 becomes larger.

The shapes and arrangements of the plurality of prism pieces 3 will be described in detail in the section of "(2.4) Prism Pieces".

Hereinafter, the light emission principle of optical system 100 of the present exemplary embodiment will be described with reference to FIGS. 1A, 1B, and 3A.

First, as illustrated in FIG. 1A, the spread angle of the light emitted from light source 4 is controlled when the light passes through corresponding light controller 2. The light whose spread angle is controlled is emitted from light controller 2 toward incident surface 10 of light guide member 1. In the present exemplary embodiment, the light emitted from light controller 2 becomes parallel light parallel to second surface 12 and is incident perpendicular to incident surface 10.

As already described, optical axis Ax1 of the light incident from incident surface 10 of light guide member 1 is inclined with respect to first surface 11 so that the distance to first surface 11 decreases as the distance from incident surface 10 increases. Therefore, most of the light incident on incident surface 10 does not reach second surface 12 and end surface 13 facing incident surface 10 of light guide member 1, but reaches first surface 11.

As illustrated in FIG. 1B, most of the light incident on incident surface 10 is totally reflected by reflective surface 30 of any one of the plurality of prism pieces 3 provided on first surface 11 without being reflected on first surface 11 and second surface 12. That is, light guide member 1 includes direct optical path L1 in which light incident from incident surface 10 is directly reflected by prism pieces 3 and emitted from second surface 12. Further, in the present exemplary embodiment, direct optical path L1 includes an optical path of light totally reflected by prism pieces 3. The light totally reflected by reflective surface 30 of prism pieces 3 is emitted from second surface 12.

In the present exemplary embodiment, since the plurality of prism pieces 3 are disposed over the entire area of first surface 11, the light passing through direct optical path L1 as described above is evenly emitted from the entire area of second surface 12 of light guide member 1. As a result, entire second surface 12 emits surface light.

In the present exemplary embodiment, inclination angles θ10 are determined so that the light emitted from second surface 12 is directed to the outside in the first direction with respect to reference light beam L100 as two or more prism pieces 3 among the plurality of prism pieces 3 are positioned closer to both ends of first surface 11 in the first direction. Therefore, as illustrated in FIG. 3A, light L10 reflected by prism pieces 3 and emitted from second surface 12 as an emitting surface is emitted in different directions at the central portion and both end portions in the first direction (X-axis direction) of second surface 12. In particular, since light L10 is emitted from both end portions of second surface 12 in the first direction toward the outside in the first direction (X-axis direction), light L10 emitted from second surface 12 is emitted in a direction that spreads as a whole.

Among the light beams (light L10) emitted from second surface 12, the reference light beam is defined as "reference light beam L100". In the present exemplary embodiment, as an example, as illustrated in FIG. 3A, a light beam (light L10) emitted from the vicinity of the center (central portion) in the first direction (X-axis direction), or more strictly, light beam (light L10) emitted from the center of second surface 12 is referred to as reference light beam L100. In the present exemplary embodiment, reference light beam L100 is a light beam perpendicular to second surface 12, in other words, a light beam along the normal line of second surface 12. That is, light L10 is emitted from both end portions of second surface 12 in the first direction so as to face toward the outside in the first direction with respect to reference light beam L100 (normal line of second surface 12).

Hereinafter, the advantages of optical system 100 of the present exemplary embodiment will be described with comparison with a general light guide member (light guide plate).

In a general light guide member, the light incident from the incident surface of the light guide member is guided inside the light guide member while being repeatedly reflected a plurality of times on both surfaces (corresponds to first surface 11 and second surface 12) in the thickness direction of the light guide member. The prism provided on one surface (corresponds to first surface 11) of the light guide member in the thickness direction breaks the condition (that is, incident angle≥critical angle) of total reflection, and therefore light is emitted from the other surface (corresponds to second surface 12) of the light guide member as an emitting surface in the thickness direction. As a result, even in a general light guide member, the entire emitting surface emits light.

However, in the general light guide member as described above, the light incident from the incident surface of the light guide member is repeatedly reflected a plurality of times on both surfaces in the thickness direction of the light guide member, and therefore light is guided to a portion of the light guide member away from the incident surface. Therefore, as the number of times that light is totally reflected increases, the condition (that is, incident angle-≥critical angle) of total reflection is easily broken, and there is a high possibility that light leaks from one surface (corresponds to first surface 11) of the light guide member in the thickness direction.

On the other hand, since optical system 100 according to the present exemplary embodiment includes light controller 2 and the plurality of prism pieces 3 as described above, most of the light incident on incident surface 10 of light guide member 1 follows direct optical path L1. That is, in the present exemplary embodiment, most of the light incident on incident surface 10 of light guide member 1 is directly incident on prism pieces 3 and emitted from second surface 12 without being totally reflected repeatedly on first surface 11 and second surface 12. Therefore, in the present exemplary embodiment, unlike a general light guide member, since the condition of total reflection is not broken, light is less likely to leak from first surface 11, and as a result, the efficiency of light extraction can be improved, and a relatively large light intensity can be realized.

In the present exemplary embodiment, the light emitted from second surface 12 in direct optical path L1 is 50% or more of the light incident on light guide member 1 from incident surface 10. That is, a part of the light incident on incident surface 10 of light guide member 1 may not pass through direct optical path L1, but in the present exemplary embodiment, most (more than half) of the light incident on incident surface 10 is emitted from second surface 12 through direct optical path L1. As a result, the efficiency of light extraction of light guide member 1 becomes at least 50%. The efficiency of light extraction of light guide member 1 is more preferably 70% or more and further may be 80% or more.

As described above, by improving the efficiency of light extraction of light guide member 1, optical elements such as a reflective sheet, a prism sheet, a reflective polarizing film (DBEF: Dual Brightness Enhancement Film), and a Fresnel lens sheet are not required on first surface 11 side of light guide member 1. That is, since light is unlikely to leak from first surface 11, it is not necessary to arrange these optical elements on first surface 11 side of light guide member 1, and sufficient efficiency of light extraction can be realized.

In optical system 100 according to the present exemplary embodiment, due to the arrangement of the plurality of prism pieces 3, light L10 emitted from second surface 12 is emitted in different directions at the central portion and both end portions of second surface 12 in the first direction (X-axis direction), as illustrated in FIG. 3A. This is advantageous in the following points over optical system 100X according to a comparative example as illustrated in FIG. 3B.

Figure 3B:
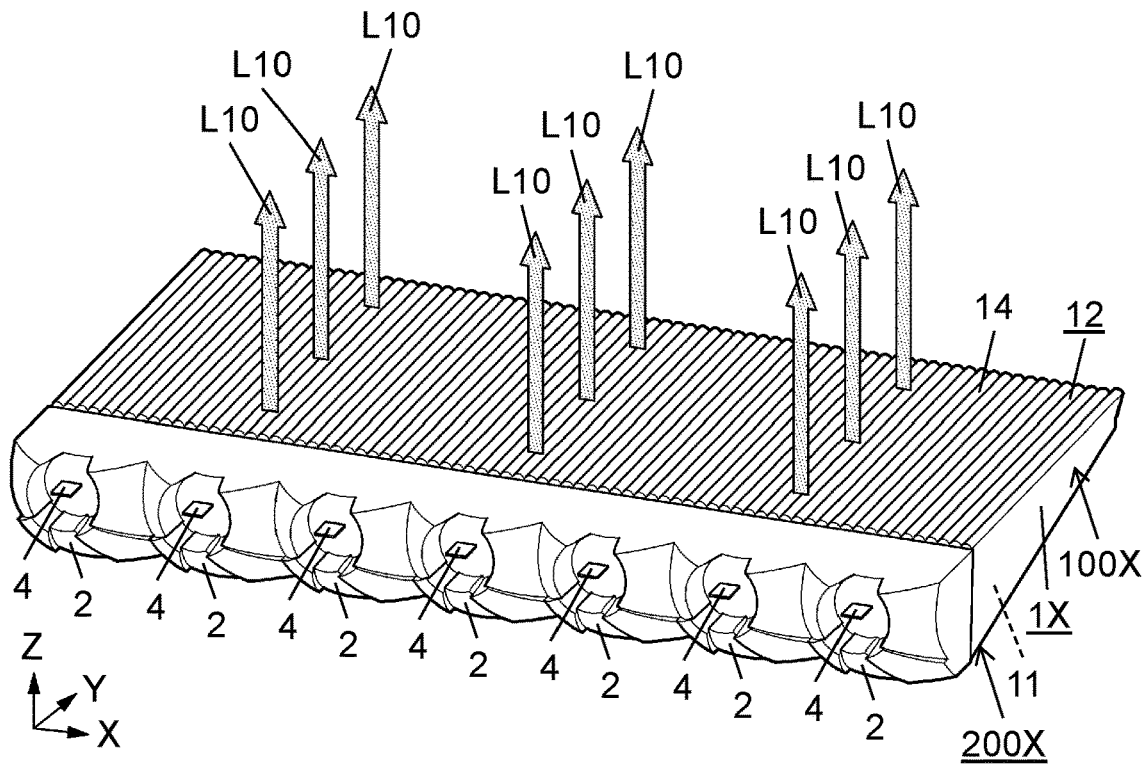
FIG. 3B is a perspective view illustrating an outline of an optical system according to a comparative example.

FIG. 3B is a perspective view illustrating an outline of optical system 100X according to the comparative example. In optical system 100X according to the comparative example, the arrangement of the plurality of prism pieces 3 in light guide member 1X is different from that of optical system 100 according to the present exemplary embodiment. That is, in optical system 100X according to the comparative example, inclination angles θ10 of the plurality of prism pieces 3 disposed so as to be substantially staggered on first surface 11 of light guide member 1X are all 0 degree with respect to incident surface 10. That is, in optical system 100X, the plurality of prism pieces 3 are all disposed parallel to incident surface 10 (parallel to the X axis).

In optical system 100X according to the comparative example, light L10 emitted from second surface 12 which is an emitting surface is uniformly emitted along the normal line of second surface 12. That is, when second surface 12 is viewed from the front (one side in the X-axis direction), light L10 is emitted in the same direction from the entire area of second surface 12, and the brightness of the entire area of second surface 12 becomes substantially uniform. With a backlight of a general liquid crystal display or the like, there is no problem even if the brightness distribution is uniform as in optical system 100X according to the comparative example, but in the head-up display mounted on moving object B1, such a brightness distribution is not always preferable.

That is, when optical system 100 including light guide member 1 is applied to the head-up display mounted on moving object B1 as in display system 300 according to the present exemplary embodiment, a special brightness distribution may be required on the emitting surface (second surface 12) of light guide member 1. That is, in display system 300 such as a head-up display, the image on display surface 312 does not become virtual image E1 as it is, but virtual image E1 is formed via optical system 320. Therefore, in order to make the brightness uniform in virtual image E1, it is necessary to design the brightness distribution on display surface 312 in a state where the characteristics of optical system 320 are combined and the brightness becomes uniform. Therefore, a desired brightness distribution may be required on the emitting surface (second surface 12) of light guide member 1 so that the brightness distribution on display surface 312 becomes the desired brightness distribution.

In optical system 100 according to the present exemplary embodiment, by devising the arrangement of the plurality of prism pieces 3, light L10 emitted from second surface 12 is emitted in different directions at the central portion and both end portions of second surface 12 in the first direction (X-axis direction), as illustrated in FIG. 3A. In particular, since light L10 is emitted from both end portions of second surface 12 in the first direction toward the outside in the first direction (X-axis direction) with respect to reference light beam L100, light L10 emitted from second surface 12 is emitted in a direction that spreads as a whole. As a result, there is an advantage that the brightness distribution on second surface 12 as an emitting surface can be adjusted by inclination angles θ10 of the plurality of prism pieces 3, and a desired brightness distribution can be easily realized.

(2.4) Prism Pieces

Next, the shapes and arrangements of the plurality of prism pieces 3 will be described in detail with reference to FIGS. 6A to 7C.

Although only a part of first surface 11 is illustrated in FIGS. 6A and 7A, in reality, a plurality of prism pieces 3 are formed over substantially the entire area of first surface 11. Further, in FIGS. 6A and 7A, in order to explain the shapes and arrangements of the plurality of prism pieces 3, the plurality of prism pieces 3 are schematically represented by thinning out the plurality of prism pieces 3 from an actual number and illustrating each prism piece 3 larger than the actual one. Similarly, in the drawings after FIG. 8, the plurality of prism pieces 3 are schematically represented.

In optical system 100 according to the present exemplary embodiment, as described above, the plurality of prism pieces 3 are disposed so as to be substantially staggered (zigzag pattern) on first surface 11 when viewed from one side in the Z-axis direction. Each of the plurality of prism pieces 3 is formed in a rectangular shape having a predetermined length in a plan view (viewed from one side in the Z-axis direction).

Specifically, on first surface 11, the plurality of prism pieces 3 are disposed so as to be arranged at intervals in the first direction (X-axis direction). Further, the plurality of prism pieces 3 are disposed so as to be disposed at intervals in second surface 12 even in the Y-axis direction as the second direction orthogonal to the first direction (X-axis direction). When the rows of the plurality of prism pieces 3 arranged in the X-axis direction are a first row, a second row, a third row, . . . counting from incident surface 10 side in the Y-axis direction, the plurality of prism pieces 3 included in the even-numbered rows and the plurality of prism pieces 3 included in the odd-numbered rows are positioned at positions displaced from each other in the X-axis direction.

In the present exemplary embodiment, in particular, the plurality of prism pieces 3 are disposed on virtual arcs Va1 on first surface 11. Virtual arc Va1 is a virtual "arc" defined on first surface 11 and is not accompanied by an entity. As an example in the present exemplary embodiment, virtual arc Va1 is a virtual "arc" composed of a part of the circumference of a perfect circle. The center of the perfect circle including virtual arc Va1 is positioned on the side opposite to incident surface 10 in the Y-axis direction when viewed from virtual arc Va1. Therefore, virtual arc Va1 is a virtual arc that is curved so that the central portion in the X-axis direction is convex toward incident surface 10. The term "arc" as used in the present disclosure is not limited to a part of the circumference of a perfect circle having a constant curvature, but may be a part of the circumference of an ellipse or an oval whose curvature changes in the middle.

In the present exemplary embodiment, a plurality of virtual arcs Va1 are set in the second direction (Y-axis direction). In the present exemplary embodiment, as an example, the plurality of virtual arcs Va1 are formed in a concentric circle at equal intervals. That is, each of the plurality of virtual arcs Va1 is a virtual arc curved so that the central portion in the X-axis direction is convex toward incident surface 10. The plurality of virtual arcs Va1 have different radii of curvature from each other, and in the Y-axis direction, as virtual arc Va1 is closer to incident surface 10, the radius of curvature becomes larger. In other words, when the plurality of virtual arcs Va1 are counted from incident surface 10 side as a first, a second, a third, . . . , the radius of curvature of virtual arc Va1 decreases in the order of the first, second, third, and so on.

The plurality of prism pieces 3 are separately disposed in the plurality of virtual arcs Va1 so that two or more prism pieces 3 are positioned on each virtual arc Va1. That is, two or more prism pieces 3 in each row of the first row, the second row, the third row, . . . counting from incident surface 10 side in the Y-axis direction are disposed on virtual arcs Va1 in the first row, the second row, the third row, and so on, respectively, counting from incident surface 10 side. Further, since the plurality of prism pieces 3 included in the even-numbered rows and the plurality of prism pieces 3 included in the odd-numbered rows are positioned at positions displaced from each other in the X-axis direction, as illustrated in FIG. 6A, prism pieces 3 on adjacent virtual arcs Va1 are positioned at positions displaced from each other in the X-axis direction.

By the way, in the present disclosure, the arrangement and pitch of each prism piece 3 in first surface 11, mean the position and pitch of representative point P1 (see FIG. 7A) included in each prism piece 3 in a plan view (viewed from one side in the Z-axis direction). That is, since each prism piece 3 has a certain size (area) in a plan view, the exact position of each prism piece 3 is defined by representative point P1 of each prism piece 3. Representative point P1 is a virtual "point" set one by one in each prism piece 3 in a plan view and is not accompanied by an entity. In the present exemplary embodiment, as an example, it is assumed that representative point P1 is the center (center of gravity) point of prism piece 3 in a plan view. That is, in the present exemplary embodiment, as illustrated in FIG. 7A, the plurality of prism pieces 3 are disposed on first surface 11 so that respective representative points P1 are positioned on virtual arcs Va1 in a plan view (viewed from one side in the Z-axis direction).

Inclination angles θ10 are determined so that the light emitted from second surface 12 is directed to the outside in the first direction with respect to reference light beam L100 as two or more prism pieces 3 among the plurality of prism pieces 3 are positioned closer to both ends of first surface 11 in the first direction, that is, closer to the outside in the X-axis direction. That is, as two or more prism pieces 3 among the plurality of prism pieces 3 are positioned closer to both ends of first surface 11 in the first direction, the light emitted from second surface 12 is largely inclined toward the outside in the first direction with respect to reference light beam L100. Basically, as illustrated in FIGS. 6A to 6D, as the plurality of prism pieces 3 are positioned closer to both ends in the first direction of first surface 11, that is, closer to the outside in the X-axis direction, inclination angle θ10 of prism piece 3 becomes larger. In the present exemplary embodiment, as illustrated in FIGS. 6B to 6D, in a plan view (viewed from one side in the Z-axis direction), inclination angle θ10 is an angle of the central axis passing through representative point P1 and parallel to the length of prism piece 3 with respect to incident surface 10, that is, an angle with respect to the X axis. That is, inclination angle θ10 represents the degree of inclination of prism piece 3 having a predetermined length with respect to incident surface 10, and inclination angle θ10 of prism piece 3 parallel to incident surface 10 is "0 degree".

More specifically, in the present exemplary embodiment, inclination angle θ10 of each prism piece 3 is set so that the central axis of each prism piece 3 and the tangent line of virtual arc Va1 at representative point P1 of each prism piece 3 coincide with each other. Therefore, focusing on two prism pieces 3 on same virtual arc Va1, one prism piece 3 adjacent to the other prism piece 3 in the clockwise direction has a shape in which one prism piece 3 is rotated in the clockwise direction about representative point P1. That is, even on same virtual arc Va1, inclination angle θ10 increases as the distance from the center in the first direction (X-axis direction) increases. Further, focusing on two prism pieces 3 positioned in the same row counting from the center in the first direction, one prism piece 3 on virtual arc Va1 having a smaller radius of curvature than the other prism piece 3 has larger inclination angle θ10 than the other prism piece 3.

Therefore, in prism piece 3 positioned at the center in the first direction (X-axis direction) on first surface 11, as illustrated in FIG. 6B (area A1 of FIG. 6A), inclination angle θ10 is first angle θ101 having "0 degree". With the center in the first direction as a first row, in prism piece 3 positioned in a third row counting from the center, as illustrated in FIG. 6C (area A2 in FIG. 6A), inclination angle θ10 becomes second angle θ102 that is larger than the first angle (0 degree). Further, in prism piece 3 positioned in the third row counting from the center in the first direction and in the third row counting from incident surface 10 side in the second direction, as illustrated in FIG. 6D (area A3 in FIG. 6A), inclination angle θ10 becomes third angle θ103 that is larger than second angle θ102. That is, first angle θ101, second angle θ102, and third angle θ103 have a relationship of "θ101<θ102<θ103".

Due to the arrangements of the plurality of prism pieces 3 as described above, as illustrated in FIG. 6A, light L10 as parallel light incident on incident surface 10 is reflected by prism pieces 3 toward the outside in the first direction as the prism piece is positioned closer to both ends in the first direction (X-axis direction). That is, the reflection direction of light L10 on prism piece 3 is determined according to inclination angle θ10 with respect to incident surface 10 of prism piece 3, and therefore inclination angle θ10 of prism piece 3 becomes larger as the prism piece is positioned closer to both ends of first surface 11 in the first direction. Therefore, as prism piece 3 is closer to the outside in the first direction, light L10 reflected by prism piece 3 is emitted from second surface 12 as an emitting surface toward the outside in the first direction with respect to reference light beam L100. In FIG. 6A, light L10 before reflection by prism piece 3 is indicated by a void arrow, and light L10 (reflected light) after reflection by prism piece 3 is indicated by an arrow with shading (dot hatching).

In the present exemplary embodiment, as illustrated in FIG. 7A, the plurality of prism pieces 3 have a uniform pitch in the first direction (X-axis direction) in a plan view (viewed from one side in the Z-axis direction). The "pitch in the first direction" here means the distance (interval) between representative points P1 in the first direction (X-axis direction). That is, the pitch, which is the interval between representative points P1 of the plurality of prism pieces 3 in the first direction, is set to be constant. In the present exemplary embodiment, the plurality of prism pieces 3 included in the even-numbered rows and the plurality of prism pieces 3 included in the odd-numbered rows, counting from incident surface 10 side in the Y-axis direction, are displaced from each other in the X-axis direction. When the amount of deviation in the X-axis direction is unit pitch Dx1, the pitch in the first direction of the pair of prism pieces 3 adjacent to each other on same virtual arc Va1 is twice unit pitch Dx1 (2Dx1).

As a result, the plurality of prism pieces 3 include a first set and a second set. The first set consists of two prism pieces 3 adjacent to each other in the first direction. The second set is positioned at a position farther from the center of first surface 11 in the first direction than the first set and consists of two prism pieces 3 adjacent to each other in the first direction. The pitch in the first direction is the same for the first set and the second set. For example, it is assumed that the center of first surface 11 in the first direction (X-axis direction) is a first row, prism pieces 3 positioned in the first row and prism pieces 3 positioned in a second row are a first set, and prism piece 3 positioned in the second row and prism piece 3 positioned in the third row are a second set. In this case, the pitch (2Dx1) in the first direction is the same for the first set (prism pieces 3 in the first and second rows) and the second set (prism pieces 3 in the second and third rows). That is, in the present exemplary embodiment, there are at least two sets of a pair of prism pieces 3 having the same pitch (2Dx1) in the first direction (X-axis direction).

Among the plurality of prism pieces 3, the pitches of two prism pieces 3 adjacent to the first direction in the first direction are the same for all of the plurality of prism pieces 3. That is, in the present exemplary embodiment, the pitch (2Dx1) in the first direction (X-axis direction) is the same for all of the plurality of prism pieces 3. As a result, in a plan view (viewed from one side in the Z-axis direction), a plurality of prism pieces 3 having a uniform pitch in the first direction (X-axis direction) are realized.

The plurality of prism pieces 3 include a third set and a fourth set. The third set consists of two prism pieces 3 adjacent to each other on virtual arc Va1. The fourth set is positioned at a position farther from the center of first surface 11 in the first direction than the third set and consists of two prism pieces 3 adjacent to each other on virtual arc Va1. In the third set and the fourth set, the fourth set has a wider pitch along virtual arc Va1. The "pitch along virtual arc Va1" here means the distance (interval) between representative points P1 on virtual arc Va1. For example, with the center of first surface 11 in the first direction (X-axis direction) is a first row, two prism pieces 3 positioned on both sides (second rows) of the first row are a third set, and prism pieces 3 positioned in the second row and prism pieces 3 positioned in a fourth row are a fourth set. In this case, pitch Dc2 along virtual arc Va1 in the fourth set (prism pieces 3 in the second and fourth rows) is larger than pitch Dc1 along virtual arc Va1 in the third set (prism pieces 3 in the second and second rows). That is, in FIG. 7A, pitch Dc1 and pitch Dc2 have a relationship of "Dc1<Dc2".

However, in the present exemplary embodiment, since the plurality of prism pieces 3 are disposed on virtual arc Va1 on first surface 11, in a plan view (viewed from one side in the Z-axis direction), the pitch in the second direction (Y-axis direction) is not uniform. The "pitch in the second direction" here means the distance (interval) between representative points P1 in the second direction (Y-axis direction). That is, as illustrated in FIG. 7A, the pitch in the Y-axis direction between the pair of prism pieces 3 adjacent to each other in the second direction becomes larger as the prism piece is positioned closer to both ends of first surface 11 in the first direction (X-axis direction). For example, with the center of first surface 11 in the first direction (X-axis direction) as a first row, pitch Dy2 of two prism pieces 3 positioned in the fourth row counting from the center in the second direction is larger than pitch Dy1 of two prism pieces 3 positioned in the first row in the second direction. That is, in FIG. 7A, pitch Dy1 and pitch Dy2 have a relationship of "Dy1<Dy2".

By the way, in the present exemplary embodiment, the shapes of the plurality of prism pieces 3 are not completely the same, and the plurality of prism pieces 3 include a plurality of types of prism pieces 3 having different shapes from each other. Specifically, the plurality of types of prism pieces 3 differ in inclination angle θ1 of reflective surface 30 and the depth of the recess as prism piece 3 (in other words, the height of prism piece 3). In other words, the plurality of prism pieces 3 include two or more prism pieces 3 having different heights H11 and H12 from first surface 11.

In the present exemplary embodiment, heights H11 and H12 of the plurality of prism pieces 3 become larger as the prism piece is positioned closer to both ends of first surface 11 in the first direction (X-axis direction). In other words, heights H11 and H12 of prism pieces 3 increase as the distance from the center of first surface 11 in the X-axis direction increases. Specifically, in prism piece 3 positioned at the center of first surface 11 in the first direction (X-axis direction), as illustrated in FIG. 7B (cross-sectional view taken along the line A1-A1 of FIG. 7A), inclination angle θ1 of reflective surface 30 is first angle θ11 and has height H11. On the other hand, with the center in the first direction as a first row, in prism piece 3 positioned in the fourth row counting from the center, as illustrated in FIG. 7C (cross-sectional view taken along line B1-B1 in FIG. 7A), inclination angle θ1 of reflective surface 30 is second angle θ12 larger than first angle θ11 and has height H12. Height H11 and height H12 have a relationship of "H11<H12".

As described above, in the present exemplary embodiment, the pitch in the Y-axis direction between the pair of prism pieces 3 adjacent to each other in the second direction becomes larger as the prism piece is positioned closer to both ends of first surface 11 in the first direction (X-axis direction). Therefore, assuming that the heights of the plurality of prism pieces 3 are uniform, the amount of light that cannot be captured by prism pieces 3 increases as the prism piece is positioned closer to both ends of first surface 11 in the first direction (X-axis direction), which may cause loss. In the present exemplary embodiment, in consideration of this point, by increasing the height of prism piece 3 closer to both ends of first surface 11 in the first direction (X-axis direction), the light that cannot be captured by prism piece 3 is reduced, and the loss is reduced.

As an example, the height of prism piece 3 is preferably 1 μm or more and 100 μm or less. Similarly, as an example, the pitch of the plurality of prism pieces 3 in the Y-axis direction is preferably 1 μm or more and 1000 μm or less.

In the plurality of types of prism pieces 3, only inclination angle θ1 of reflective surface 30 and the height of prism pieces 3 are different, and the other shapes are the same. Therefore, the shape of the prism piece 3 (viewed from one side in the Z-axis direction) in a plan view, including the dimension (length) in the longitudinal direction of prism piece 3, is the same for all of the plurality of prism pieces 3. As described above, in the present exemplary embodiment, length W1 of each of the plurality of prism pieces 3 is the same for all of the plurality of prism pieces 3. For example, in FIG. 7A, with the center of first surface 11 in the first direction (X-axis direction) as a first row, length W1 of prism piece 3 positioned in the third row counting from the center is the same as the length (same as effective length Lx1) of prism piece 3 positioned in the first row.

Therefore, the effective length of prism piece 3 in the first direction (X-axis direction) becomes smaller as the prism piece is positioned closer to both ends of first surface 11 in the first direction. The "effective length of prism piece 3 in the first direction" here is the length when the side of prism piece 3 on incident surface 10 side in the width direction is projected onto the X-axis. That is, in the present exemplary embodiment, since inclination angle θ10 with respect to incident surface 10 becomes larger as the prism piece is positioned closer to both ends of first surface 11 in the first direction (X-axis direction), the effective length becomes small. For example, with the center of first surface 11 in the first direction (X-axis direction) as a first row, effective length Lx2 of prism piece 3 positioned in a fourth row counting from the center in the first direction is smaller (shorter) than effective length Lx1 of prism piece 3 positioned in the first row in the first direction. That is, in FIG. 7A, effective length Lx1 and effective length Lx2 have a relationship of "Lx2<Lx1".

(3) Modification Example

Exemplary Embodiment 1 is just one of the various exemplary embodiments of the present disclosure. Exemplary Embodiment 1 can be changed in various ways depending on the design and the like as long as the object of the present disclosure can be achieved. Each drawing described in Exemplary Embodiment 1 is a schematic view, and the ratio of the size and the thickness of the components in the drawing does not necessarily reflect an actual dimensional ratio.

Hereinafter, modification examples of Exemplary Embodiment 1 will be listed. The modification examples described below can be applied in combination with Exemplary Embodiment 1 as appropriate.

(3.1) First Modification Example

Figure 8:
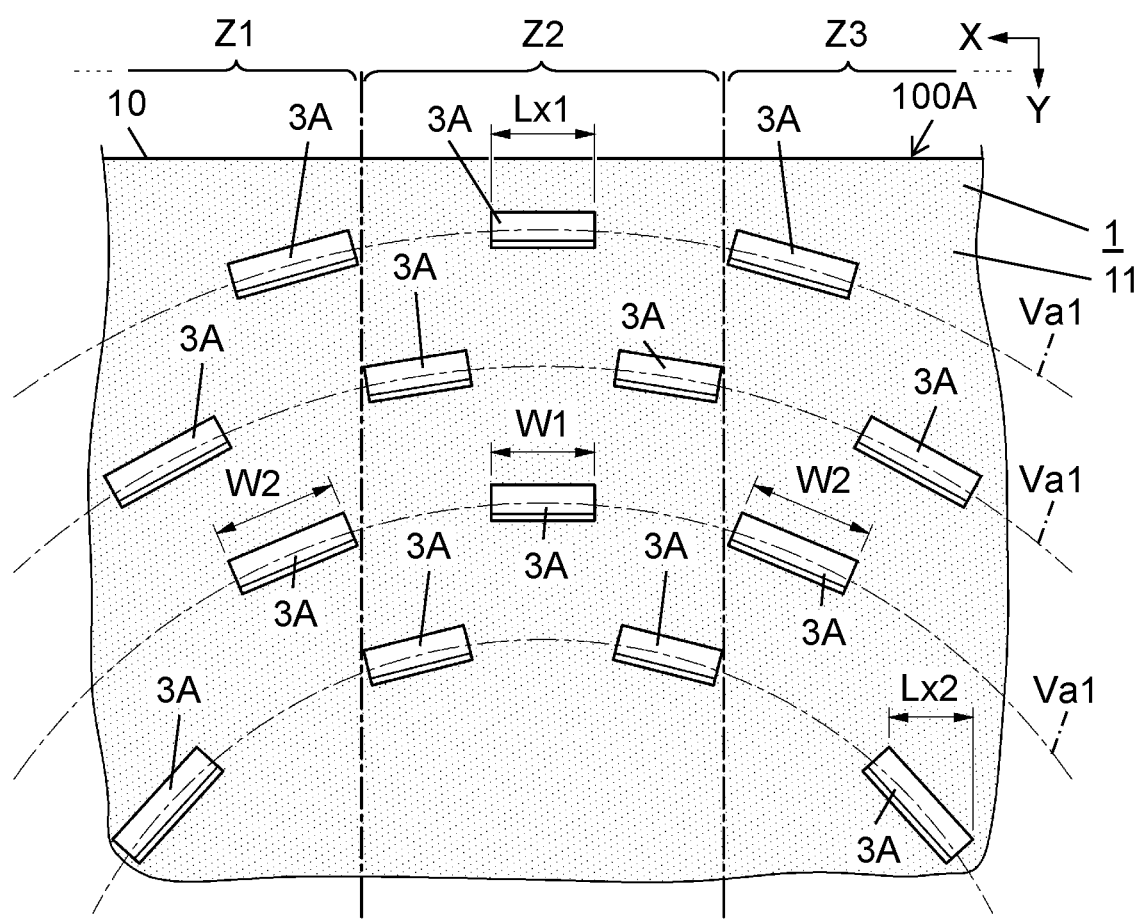
FIG. 8 is a schematic plan view of an optical system according to a first modification example of Exemplary Embodiment 1.

As illustrated in FIG. 8, optical system 100A according to a first modification example differs from optical system 100 according to Exemplary Embodiment 1 in that the lengths of a plurality of prism pieces 3A are not the same for all of the plurality of prism pieces 3A.

That is, in the first modification example, as illustrated in FIG. 8, the length of each of the plurality of prism pieces 3A becomes larger as the prism piece is positioned closer to both ends of first surface 11 in the first direction (X-axis direction). For example, in FIG. 8, with the center of first surface 11 in the first direction (X-axis direction) as a first row, length W2 of prism piece 3A positioned in a third row counting from the center is larger (longer) than length W1 of prism piece 3A positioned in the first row. That is, in FIG. 8, length W1 and length W2 have a relationship of "W1<W2".

In the example of FIG. 8, first surface 11 is divided into first area Z1, second area Z2, and third area Z3 in the X-axis direction, and the length of prism piece 3A is determined for each area. Second area Z2 is positioned at the center of first surface 11 in the first direction (X-axis direction), and first area Z1 and third area Z3 are positioned on both sides of second area Z2 in the first direction. That is, prism piece 3A in second area Z2 positioned in the center of the first direction has length W1, and prism pieces 3A in first area Z1 and third area Z3 have length W2.

According to optical system 100A according to the first modification example, the difference in effective length of prism piece 3A in the first direction (X-axis direction) can be suppressed to a small size. That is, in the present modification example, inclination angle θ10 with respect to incident surface 10 becomes larger as the prism piece is positioned closer to both ends of first surface 11 in the first direction (X-axis direction), but the length of prism piece 3A becomes larger (longer). For example, with the center of first surface 11 in the first direction (X-axis direction) as a first row, effective length Lx2 of prism piece 3A positioned in a fourth row counting from the center in the first direction is shorter than effective length Lx1 of prism piece 3A positioned in the first row in the first direction, but the difference becomes smaller. As a result, according to the first modification example, by maintaining the effective length of prism piece 3A at both ends of first surface 11 in the first direction (X-axis direction), the light that cannot be captured by prism piece 3A is reduced, and the loss is reduced.

(3.2) Second Modification Example

Figure 9:
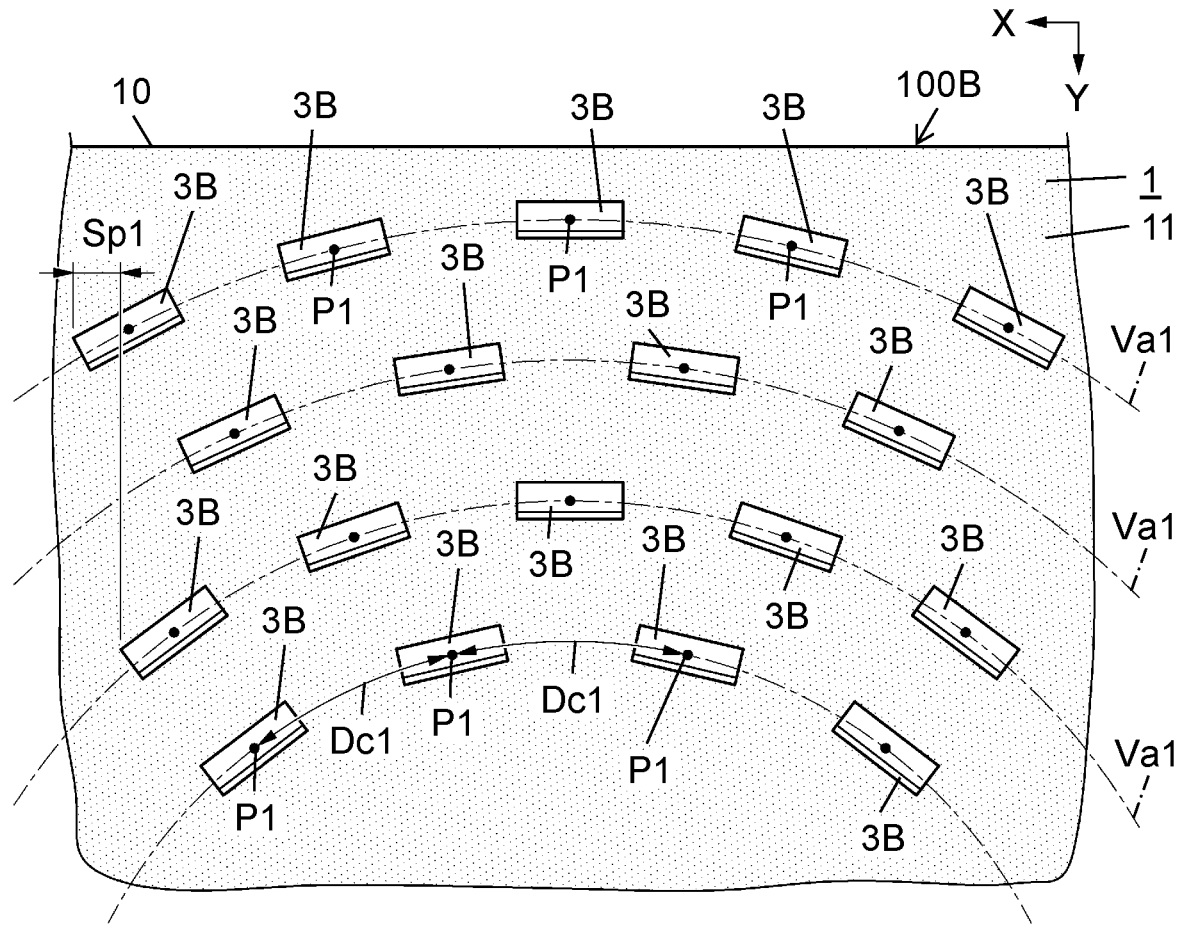
FIG. 9 is a schematic plan view of an optical system according to a second modification example of Exemplary Embodiment 1.

As illustrated in FIG. 9, optical system 100B according to a second modification example differs from optical system 100 according to Exemplary Embodiment 1 in that the pitches of a plurality of prism pieces 3B in the first direction are not the same for all of the plurality of prism pieces 3.

That is, in the second modification example, as illustrated in FIG. 9, pitch Dc1 along virtual arc Va1 is uniform. Since the plurality of virtual arcs Va1 have different radii of curvature from each other, as a result, the pitches of the plurality of prism pieces 3B in the first direction (X-axis direction) are not uniform. In short, in the Y-axis direction, virtual arc Va1 closer to incident surface 10 has a larger radius of curvature. Therefore, the pitch of a pair of prism pieces 3B adjacent on first virtual arc Va1 counting from incident surface 10 side in the first direction is larger than the pitch of the pair of prism pieces 3B adjacent to each other on third virtual arc Va1 in the first direction.

As a result, as illustrated in FIG. 9, even between the plurality of prism pieces 3B arranged in the second direction (Y-axis direction), representative points P1 are displaced in the first direction (X-axis direction), and gap Sp1 in the first direction is generated between the plurality of prism pieces 3B arranged in the second direction. Due to this gap Sp1, as the prism piece is positioned closer to both ends of first surface 11 in the first direction (X-axis direction), the amount of light that cannot be captured by prism pieces 3B increases, which may cause loss. Therefore, in optical system 100 according to Exemplary Embodiment 1, in which the pitches of the plurality of prism pieces 3 in the first direction are uniform, it is easier to reduce the loss as compared with the second modification example.

(3.3) Other Modification Examples

First surface 11 may be a surface orthogonal to incident surface 10, and second surface 12 may be a surface inclined with respect to the X-Y plane without being orthogonal to incident surface 10. Further, both first surface 11 and second surface 12 may be surfaces that are not orthogonal to incident surface 10 and are inclined with respect to the X-Y plane.

Figure 10:
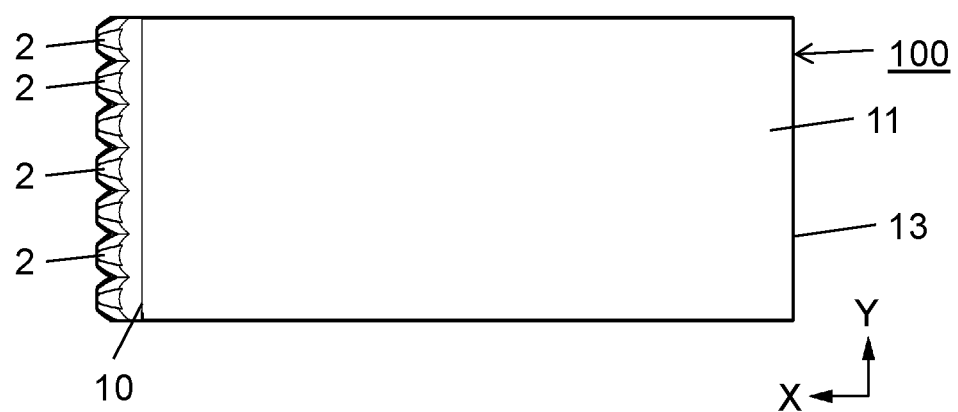
FIG. 10 is a schematic bottom view of an optical system according to another modification example of Exemplary Embodiment 1.

In Exemplary Embodiment 1, light guide member 1 is formed in a rectangular shape having a smaller dimension in the Y-axis direction than the X-axis direction, and both surfaces of light guide member 1 in the lateral direction (Y-axis direction) are incident surface 10 and end surface 13, respectively, but the configuration is not limited thereto. For example, instead of the long sides of rectangular light guide member 1, that is, both sides in the lateral direction (Y-axis direction), as illustrated in FIG. 10, the short sides of rectangular light guide member 1, that is, both surfaces in the longitudinal direction (X-axis direction) may be incident surface 10 and end surface 13, respectively. In this case, as illustrated in FIG. 10, the light incident on light guide member 1 is incident not from the long side of light guide member 1 but from the short side of light guide member 1. In this case, the Y-axis direction corresponds to the "first direction" because the Y-axis direction is a direction along both incident surface 10 and first surface 11, and the X-axis direction corresponds to the "second direction". Further, light guide member 1 is not limited to a rectangular shape in a plan view, but may be a square shape or a polygonal shape other than a quadrangular shape.

It is sufficient that the plurality of prism pieces 3 include at least two or more prism pieces 3 having different inclination angles θ10 depending on the positions thereof in the first direction, and it is not essential that inclination angle θ10 differs depending on the positions in the first direction for all of the plurality of prism pieces 3. In short, it is sufficient that there are two or more prism pieces 3 having different inclination angles θ10 depending on the positions thereof in at least the first direction, and the plurality of prism pieces 3 may include prism pieces 3 that do not satisfy such a requirement of inclination angle θ10. In this case, among the plurality of prism pieces 3, it is sufficient that inclination angles θ10 are determined so that the light emitted from second surface 12 is directed to the outside in the first direction with respect to reference light beam L100 as two or more prism pieces 3 are positioned closer to both ends of first surface 11 in the first direction.

Among the plurality of prism pieces 3, it is sufficient that inclination angles θ10 are determined so that the light emitted from second surface 12 is directed to the inside in the first direction as two or more prism pieces 3 are positioned closer to both ends of first surface 11 in the first direction. In this case, since light is emitted from both end portions of second surface 12 in the first direction toward the inside in the first direction (X-axis direction), the light emitted from second surface 12 is emitted in a direction that narrows as a whole. For example, in display system 300 such as a head-up display, it is necessary to design the brightness distribution on display surface 312 in a state where the characteristics of optical system 320 are combined and the brightness becomes uniform. Therefore, depending on the characteristics of optical system 320, a special brightness distribution may be required on the emitting surface (second surface 12) of light guide member 1 so that light is emitted in a direction that narrows as a whole. Therefore, even when the light emitted from second surface 12 is directed to the inside in the first direction, as in Exemplary Embodiment 1, there is an advantage that the brightness distribution on second surface 12 as an emitting surface can be adjusted by inclination angles θ10 of the plurality of prism pieces 3, and a desired brightness distribution can be easily realized. In short, among the plurality of prism pieces 3, it is sufficient that inclination angles θ10 are determined so that the light emitted from second surface 12 is directed to the outside or the inside in the first direction with respect to reference light beam L100 as two or more prism pieces 3 are positioned closer to both ends of first surface 11 in the first direction.

The plurality of prism pieces 3 may include a plurality of types of prism pieces 3 having different parameters other than inclination angle θ1 of reflective surface 30 and the depth of the recess as prism piece 3 (in other words, the height of prism piece 3), such as the shape of reflective surface 30 or side surface 31.

The plurality of prism pieces 3 may all have the same shape, including inclination angle θ1 of reflective surface 30, the depth of the recess as prism piece 3 (in other words, the height of prism piece 3), the longitudinal dimension of prism piece 3, and the like.

Representative point P1 used when referring to the arrangement and pitch of each prism piece 3 in first surface 11 is not limited to the center (center of gravity) point of prism pieces 3 in a plan view. That is, representative point P1 may be set in prism piece 3 in a plan view and may be set at one end portion of prism piece 3 in the longitudinal direction, for example. However, representative point P1 is preferably near the center (center of gravity) of prism piece 3 in a plan view. For example, it is preferable that representative point P1 fits in a square centered on the center (center of gravity) of prism piece 3 in a plan view and having the width dimension of prism piece 3 as one side. Alternatively, for example, it is preferable that representative point P1 fits in a circle centered on the center (center of gravity) of prism piece 3 in a plan view and having the width dimension of prism piece 3 as a diameter.

Light guide member 1 may include direct optical path L1, and it is not essential that all the light incident from incident surface 10 passes through direct optical path L1. That is, light guide member 1 may include, for example, an indirect optical path in which light is reflected by prism piece 3 and then emitted from second surface 12 after being reflected by first surface 11 or second surface 12 at least once.

Light guide member 1 does not have to include direct optical path L1.

In Exemplary Embodiment 1, the plurality of prism pieces 3 are formed by processing first surface 11 of light guide member 1, but the present exemplary embodiment is not limited thereto. For example, a plurality of prism pieces 3 may be provided on first surface 11 by attaching a prism sheet on which the plurality of prism pieces 3 are formed to first surface 11.

Prism piece 3 is not limited to a concave shape with respect to first surface 11, that is, a shape recessed from first surface 11, but may be a convex shape with respect to first surface 11, that is, a shape protruding from first surface 11.

Light distribution controller 14 may control the light distribution of the light extracted from second surface 12 and may be provided on at least one of first surface 11 and second surface 12. That is, in Exemplary Embodiment 1, light distribution controller 14 is provided on second surface 12 as an emitting surface, but is not limited to this configuration, and light distribution controller 14 may be provided on first surface 11, or may be provided on both first surface 11 and second surface 12. Further, in Exemplary Embodiment 1, light distribution controller 14 is integrated with light guide member 1 as an integrally molded product, but is not limited to this aspect. For example, light distribution controller 14 may be provided on second surface 12 by attaching a light distribution sheet on which light distribution controller 14 is formed to second surface 12.

Light distribution controller 14 may be a lens array which is a kind of multi-lenses consisting of a group of a plurality of small lenses disposed in a matrix. Each of the plurality of small lenses may be a convex lens or a concave lens. Further, light distribution controller 14 may include a Fresnel lens.

Light distribution controller 14 is not limited to a lens, but may be, for example, a diffusion sheet, a prism, a diffraction grating, or the like. Further, light distribution controller 14 is not an essential configuration for optical system 100, and light distribution controller 14 can be omitted as appropriate.

Moving object B1 on which display system 300 is mounted is not limited to a vehicle (passenger car), but may be, for example, a large vehicle such as a truck or a bus, a motorcycle, a train, an electric cart, a construction machine, an aircraft, a ship, or the like.

Display system 300 is not limited to a configuration for displaying a virtual image like a head-up display. For example, display system 300 may be a liquid crystal display or a projector device. Further, display system 300 may be a car navigation system, an electronic mirror system, or a display device of a multi-information display mounted on moving object body B11.

Lighting system 200 is not limited to the configuration used in display system 300, but may be used, for example, for industrial applications such as resin curing or plant growing, or for lighting applications including guide lights.

Light controller 2 is not an essential configuration for optical system 100 and may be omitted. That is, optical system 100 may include light guide member 1 and a plurality of prism pieces 3, and light controller 2 can be omitted as appropriate.

The center of the perfect circle including virtual arc Va1 may be positioned on incident surface 10 side in the Y-axis direction when viewed from virtual arc Va1. In this case, virtual arc Va1 is a virtual arc curved so that the central portion in the X-axis direction is convex on the side opposite to incident surface 10.

When a plurality of prism pieces 3 are disposed on virtual arc Va1 on first surface 11, it is not essential for optical system 100 that the central axis of each prism piece 3 and the tangent line of virtual arc Va1 at representative point P1 of each prism piece 3 coincide with each other. That is, representative point P1 of each prism piece 3 on first surface 11 may be on virtual arc Va1, and inclination angle θ10 of each prism piece 3 does not have to be defined by virtual arc Va1. Therefore, for example, focusing on two prism pieces 3 positioned in the same row counting from the center in the first direction, inclination angle θ10 may be the same regardless of which virtual arc Va1 the prism piece is on. Alternatively, focusing on two prism pieces 3 positioned in the same row counting from the center in the first direction, one prism piece 3 on virtual arc Va1 having a smaller radius of curvature than the other prism piece 3 has smaller inclination angle θ10 than the other prism piece 3.

The plurality of prism pieces 3 are not limited to being on virtual arc Va1 when viewed from one side in the Z-axis direction, but may be disposed so as to be arranged in a free curve shape. The term "free curve" as used in the present disclosure includes various free curves such as a C-shape, a U-shape, a J-shape, or an S-shape.

Each of the plurality of prism pieces 3 is not limited to a rectangular shape in a plan view, but may be formed in an arc shape or a free curve shape.

Inclination angle θ10 of each of the plurality of prism pieces 3 is not strictly defined, but for example, inclination angle θ10 of prism piece 3 may be defined with a variation of 10 degrees or less in each of clockwise and counterclockwise directions. It is preferable that the variation in inclination angle θ10 of prism piece 3 is suppressed to 5 degrees or less in each of the clockwise and counterclockwise directions.

Therefore, for example, a plurality of prism pieces 3 may be formed when inclination angle θ10 of each prism piece 3 is intentionally adjusted by about ±5 degrees at random with respect to inclination angle θ10 determined at the time of designing prism piece 3. Even with the plurality of prism pieces 3 adjusted in this way, inclination angle θ10 is determined so that the light emitted from second surface 12 is directed to the outside or the inside of the first direction with respect to reference light beam L100 as prism piece 3 is positioned closer to both ends of first surface 11 in the first direction.

Reference light beam L100 is not limited to the light beam (light L10) emitted from the center of second surface 12, but may be a light beam (light L10) emitted from a position deviated from the center of second surface 12.

Reference light beam L100 is not limited to a light beam perpendicular to second surface 12, but may be a light beam inclined with respect to the normal line of second surface 12.

Exemplary Embodiment 2

As illustrated in FIGS. 11A to 11D, optical system 100C according to the present exemplary embodiment is different from optical system 100 according to Exemplary Embodiment 1 in that a plurality of prism pieces 3C are disposed on the grid points of virtual grid Vg1 on first surface 11. Hereinafter, the same configurations as those in Exemplary Embodiment 1 are designated by common reference numerals, and the description thereof will be omitted as appropriate.

Virtual grid Vg1 is a virtual "grid" defined on first surface 11 and is not accompanied by an entity. As an example in the present exemplary embodiment, virtual grid Vg1 is a virtual "grid" in which the interval in the first direction (X-axis direction) and the interval in the second direction (Y-axis direction) are different. The interval of virtual grid Vg1 in the first direction is unit pitch Dx1. The interval of virtual grid Vg1 in the second direction is half of pitch Dy1 (Dy1/2).

Figure 11A:
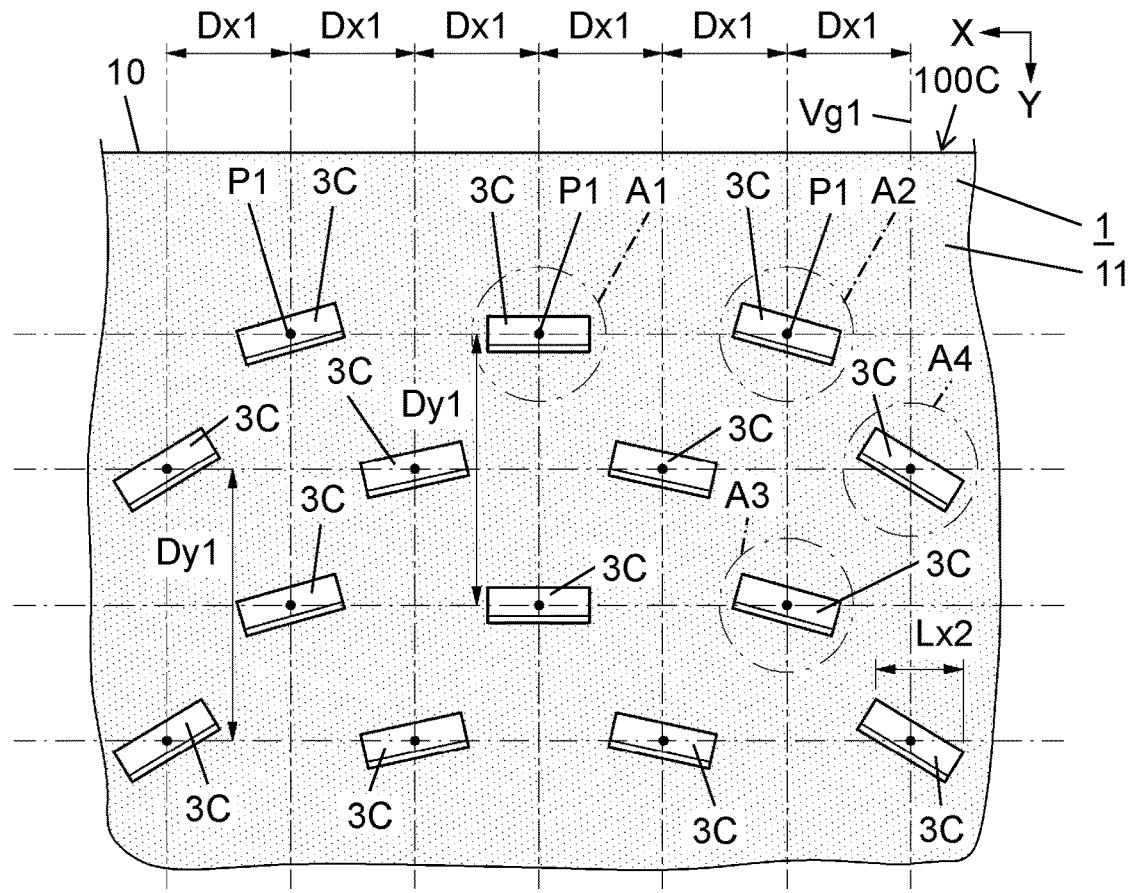
FIG. 11A is a schematic plan view of an optical system according to Exemplary Embodiment 2.

In the present exemplary embodiment, as illustrated in FIG. 11A, the plurality of prism pieces 3C are disposed on first surface 11 so that respective representative points P1 are positioned on the grid points of virtual grid Vg1 in a plan view (viewed from one side in the Z-axis direction). According to this arrangement, in the plan view (viewed from one side in the Z-axis direction), the plurality of prism pieces 3C have a uniform pitch (Dx1) in the first direction (X-axis direction) and a uniform pitch (Dy1/2) in the second direction (Y-axis direction).

Figure 11B:
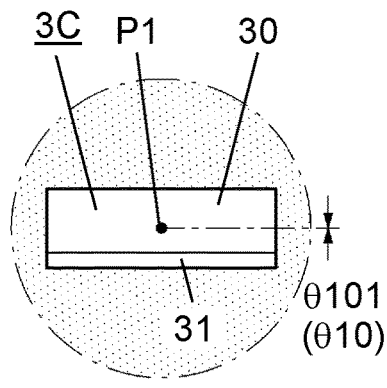
FIG. 11B is a schematic plan view of enlarged area A1 of FIG. 11A.
Figure 11C:
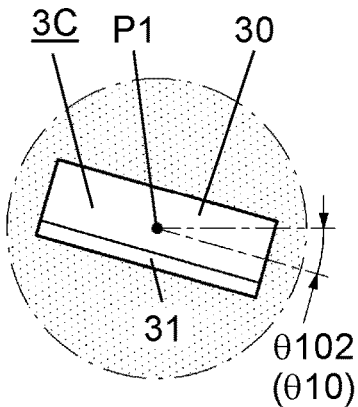
FIG. 11C is a schematic plan view of enlarged area A2 and area A3 of FIG. 11A.
Figure 11D:
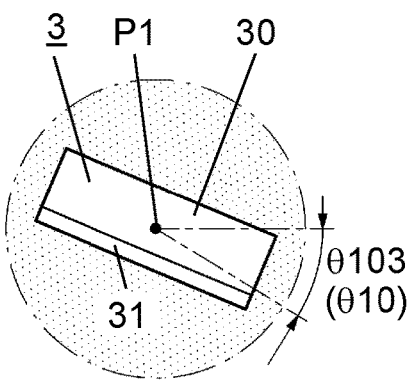
FIG. 11D is a schematic plan view of enlarged area A4 of FIG. 11A.

In the present exemplary embodiment, as illustrated in FIGS. 11A to 11D, as the plurality of prism pieces 3C are positioned closer to both ends of first surface 11 in the first direction, that is, closer to the outside in the X-axis direction, inclination angle θ10 of prism piece 3C becomes larger. FIGS. 11B and 11D are schematic plan views of enlarged areas A1 and A4 of FIG. 11A, respectively. FIG. 11C is a schematic plan view of enlarged areas A2 and A3 of FIG. 11A.

More specifically, focusing on two prism pieces 3C adjacent to the first direction (X-axis direction), one prism piece 3C positioned on the right side with respect to the other prism piece 3C has a shape in which the other prism piece 3C is rotated clockwise around representative point P1. That is, inclination angle θ10 increases as the distance from the center in the first direction (X-axis direction) increases. Further, focusing on two prism pieces 3C positioned in the same row counting from the center in the first direction, inclination angles θ10 of the two prism pieces 3C are equal.

Therefore, in prism piece 3C positioned at the center of first surface 11 in the first direction (X-axis direction), as illustrated in FIG. 11B (area A1 of FIG. 11A), inclination angle θ10 is first angle θ101 having "0 degree". With the center in the first direction as a first row, in prism piece 3C positioned in the third row counting from the center, as illustrated in FIG. 11C (areas A2 and A3 in FIG. 11A), inclination angle θ10 becomes second angle θ102 that is larger than the first angle θ101 (0 degree). Further, in prism pieces 3C positioned in the fourth row counting from the center in the first direction, as illustrated in FIG. 11D (area A4 of FIG. 11A), inclination angle θ10 becomes third angle θ103 that is larger than second angle θ102. That is, first angle θ101, second angle θ102, and third angle θ103 have a relationship of "θ101<θ102<θ103".

Due to the arrangements of the plurality of prism pieces 3C as described above, light as parallel light incident on incident surface 10 is reflected by prism piece 3C toward the outside in the first direction as the prism piece is positioned closer to both ends in the first direction (X-axis direction). That is, the reflection direction of light on prism piece 3C is determined according to inclination angle θ10 with respect to incident surface 10 of prism piece 3C, and therefore inclination angle θ10 of prism piece 3C becomes larger as the prism piece is positioned closer to both ends of first surface 11 in the first direction. Therefore, the light reflected by prism pieces 3C is emitted from second surface 12 as an emitting surface toward the outside in the first direction with respect to reference light beam L100 as the prism piece is positioned closer to the outside in the first direction.

Figure 12:
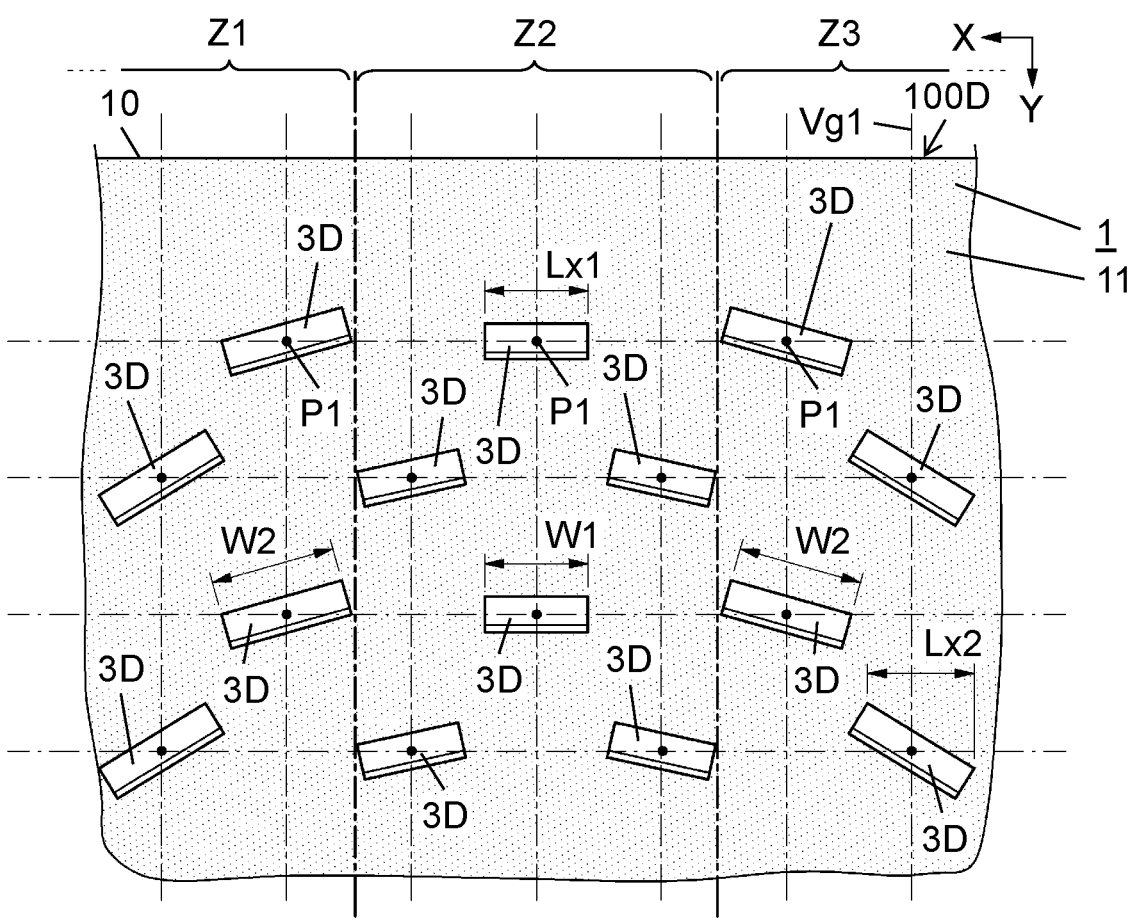
FIG. 12 is a schematic plan view of an optical system according to a modification example of Exemplary Embodiment 2.

As illustrated in FIG. 12, optical system 100D according to the modification example of Exemplary Embodiment 2 differs from optical system 100C according to Exemplary Embodiment 2 in that the length of each of a plurality of prism pieces 3D is not the same for all of the plurality of prism pieces 3D. This optical system 100D corresponds to optical system 100A (see FIG. 8) according to the first modification example of Exemplary Embodiment 1.

That is, in optical system 100D, as illustrated in FIG. 12, the length of each of the plurality of prism pieces 3D increases toward both ends in the first direction (X-axis direction) of first surface 11. For example, in FIG. 12, with the center of the first direction (X-axis direction) on first surface 11 as a first row, length W2 of prism piece 3D positioned in a third row counting from the center is larger (longer) than length W1 of prism piece 3D positioned in the first row. That is, in FIG. 12, length W1 and length W2 have a relationship of "W1<W2". In the example of FIG. 12, similarly to the first modification example of Exemplary Embodiment 1, first surface 11 is divided into first area Z1, second area Z2, and third area Z3 in the X-axis direction, and the length of prism piece 3D is determined for each area.

According to optical system 100D according to the present modification example, the difference in effective lengths of prism pieces 3D in the first direction (X-axis direction) can be suppressed to be small. That is, in the present modification example, inclination angle θ10 with respect to incident surface 10 becomes larger as the prism piece is positioned closer to both ends of first surface 11 in the first direction (X-axis direction), but the length of prism piece 3D becomes larger (longer). For example, with the center on the first surface 11 the first direction (X-axis direction) as a first row, effective length Lx2 of prism piece 3D positioned in a fourth row counting from the center in the first direction is shorter than effective length Lx1 of prism piece 3D positioned in the first row in the first direction, but the difference becomes smaller. As a result, according to the present modification example, by maintaining the effective lengths of prism pieces 3D at both ends of first surface 11 in the first direction (X-axis direction), the light that cannot be captured by prism pieces 3D is reduced, and the loss is reduced.

As another modification example of Exemplary Embodiment 2, the plurality of prism pieces 3C positioned in the same row counting from the center in the first direction may have different inclination angles θ10.

Regarding the arrangement of the plurality of prism pieces 3C, the arrangement on the grid points of virtual grid Vg1 and the arrangement on virtual arc Va1 may be combined.

The various configurations (including the modification examples) described in Exemplary Embodiment 2 can be appropriately combined with the various configurations (including the modification examples) described in Exemplary Embodiment 1.

Exemplary Embodiment 3

Figure 13:
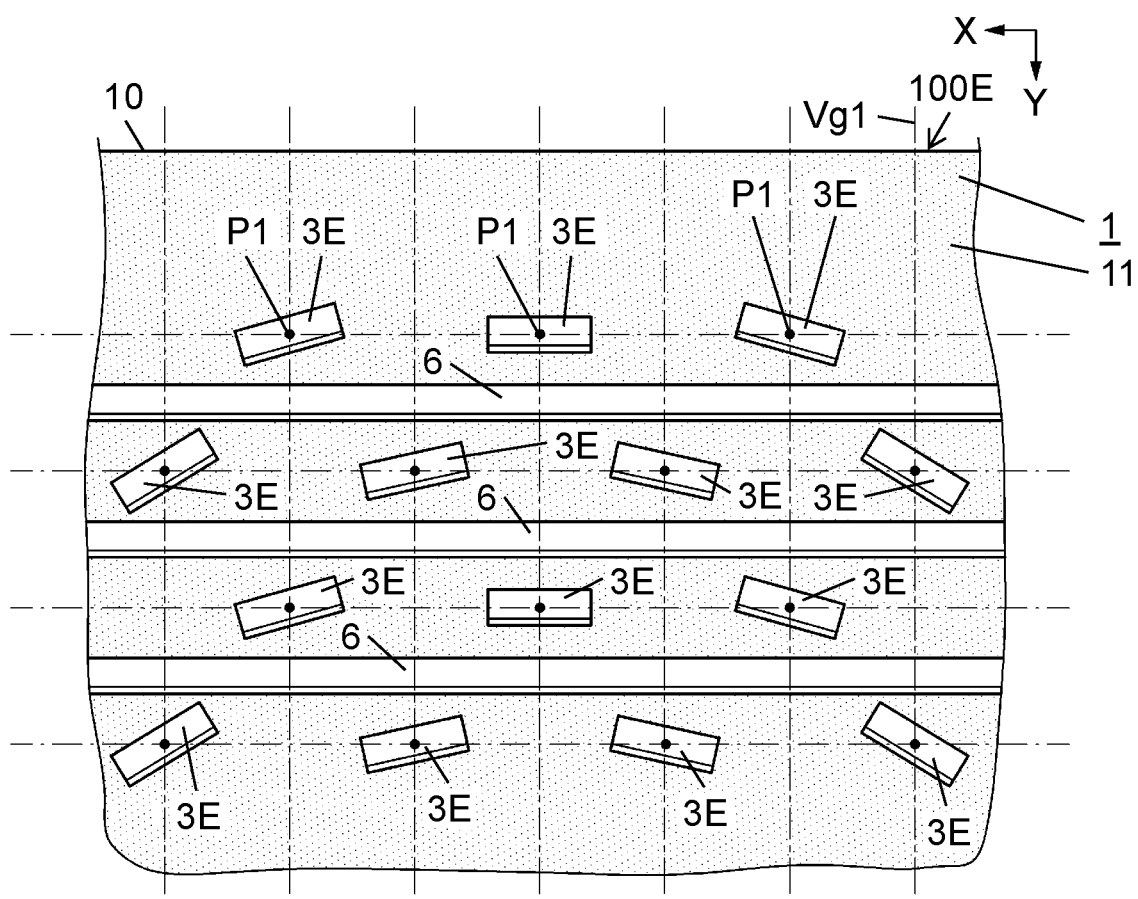
FIG. 13 is a schematic plan view of an optical system according to Exemplary Embodiment 3.

As illustrated in FIG. 13, optical system 100E according to the present exemplary embodiment is different from optical system 100C according to Exemplary Embodiment 2 in that optical system 100E further includes long prism 6. Hereinafter, the same configurations as those in Exemplary Embodiment 2 are designated by common reference numerals, and the description thereof will be omitted as appropriate.

Long prism 6 is disposed between two prism pieces 3E adjacent to each other in the second direction orthogonal to the first direction in first surface 11 among the plurality of prism pieces 3E. Long prism 6 has a length extending over two or more prism pieces 3E adjacent to each other in the first direction. That is, optical system 100E according to the present exemplary embodiment includes long prism 6 that is disposed between two prism pieces 3E adjacent to each other in the second direction (Y-axis direction) in addition to the plurality of prism pieces 3E and has a length extending over two or more prism pieces 3E adjacent to each other in the first direction (X-axis direction).

In the present exemplary embodiment, optical system 100E includes a plurality of long prisms 6. Each of the plurality of long prisms 6 is formed in a straight line parallel to the X axis when viewed from one side in the Z-axis direction. In the example of FIG. 13, the plurality of long prisms 6 are formed so as to be arranged at intervals in the Y-axis direction on first surface 11 of light guide member 1. That is, in the example of FIG. 13, a plurality of long prisms 6 are provided so as to be arranged in the second direction (Y-axis direction).

Long prisms 6 are provided on first surface 11 and reflect the light passing through the inside of light guide member 1 toward second surface 12. Long prism 6 is configured to totally reflect the incident light. Of course, long prism 6 is not limited to an aspect in which all the incident light is totally reflected, but may also include an aspect in which a part of the light passes through the inside of long prism 6 without being totally reflected.

In the present exemplary embodiment, each of the plurality of long prisms 6 has a length extending over two or more prism pieces 3E and is formed on first surface 11 so that the cross section viewed from one side in the longitudinal direction thereof is a triangular recess. In other words, each of the plurality of long prisms 6 is formed in a triangular columnar shape. Long prism 6 is formed by, for example, processing first surface 11 surface of light guide member 1. That is, the cross-sectional shape of long prism 6 is the same as that of prism piece 3E.

When the rows of the plurality of prism pieces 3E arranged in the X-axis direction are a first row, a second row, a third row, . . . counting from incident surface 10 side in the Y-axis direction, long prisms 6 are disposed between the plurality of prism pieces 3E included in the even-numbered rows and the plurality of prism pieces 3E included in the odd-numbered rows.

According to the above configuration, even if light that cannot be captured by prism piece 3E is generated, the light can be captured by long prism 6 and the loss can be reduced.

Figure 14A:
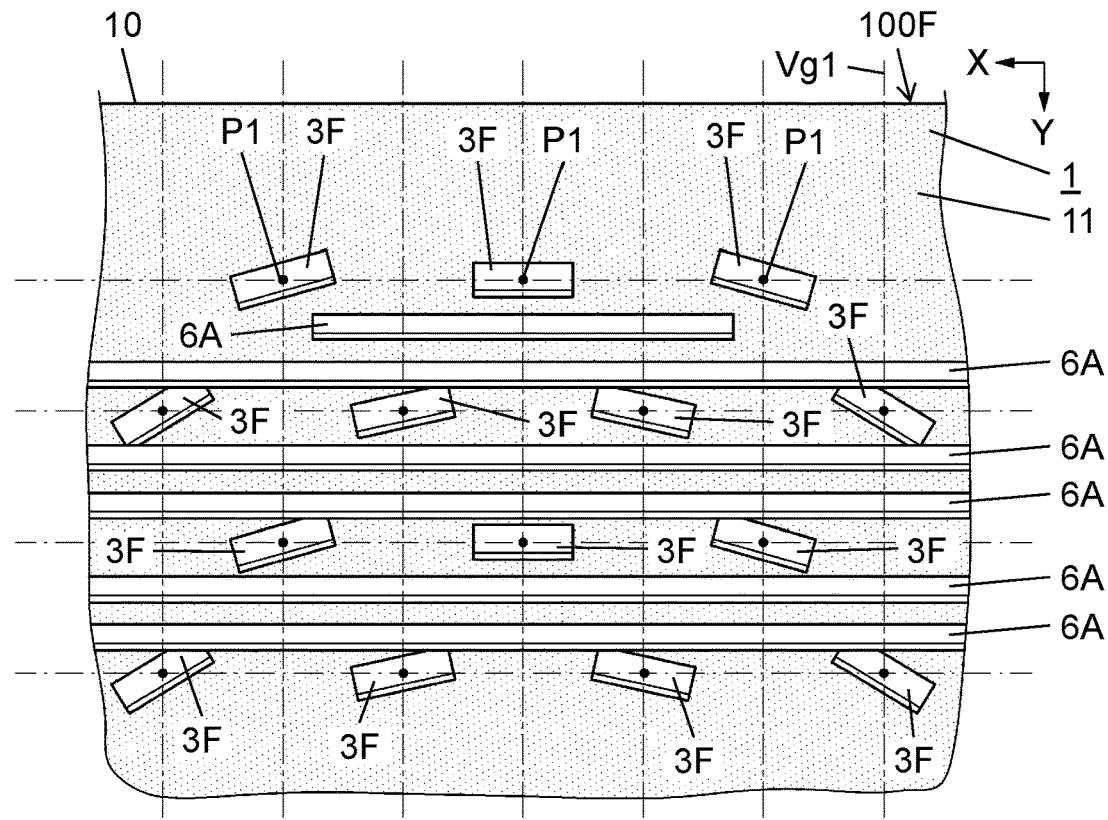
FIG. 14A is a schematic plan view of an optical system according to a modification example of Exemplary Embodiment 3.

As illustrated in FIG. 14A, optical system 100F according to a modification example of Exemplary Embodiment 3 is different from optical system 100E according to Exemplary Embodiment 3 in that the length of long prism 6A is not uniform. That is, in optical system 100F according to the present modification example, a plurality of long prisms 6A are provided, and the plurality of long prisms 6A have different lengths. In the example of FIG. 14A, among the plurality of long prisms 6A, long prism 6A closest to incident surface 10 is smaller (shorter) than the other long prisms 6A. Further, in the example of FIG. 14A, a plurality of (two) long prisms 6A are disposed between two prism pieces 3F adjacent to each other in the second direction. Further, in the example of FIG. 14A, a plurality of prism pieces 3F and long prism 6A are formed so as to partially overlap each other.

Figure 14B:
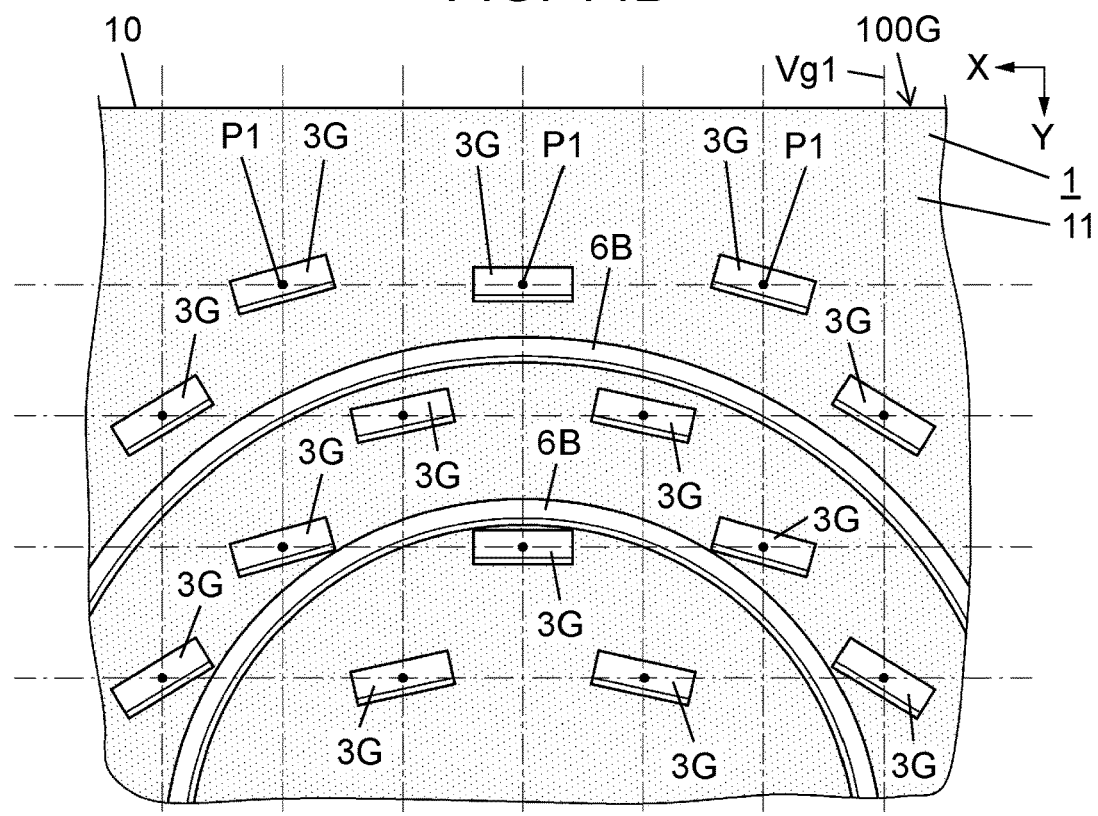
FIG. 14B is a schematic plan view of an optical system according to the modification example of Exemplary Embodiment 3.

As illustrated in FIG. 14B, optical system 100G according to another modification example of Exemplary Embodiment 3 is different from optical system 100E according to Exemplary Embodiment 3 in that long prism 6B has an arc shape. In the example of FIG. 14B, arc-shaped long prism 6B is disposed between two prism pieces 3G adjacent to each other in the second direction. As an example, long prism 6B has an arc shape in which the central portion in the X-axis direction is curved so as to be convex toward incident surface 10.

Figure 15A:
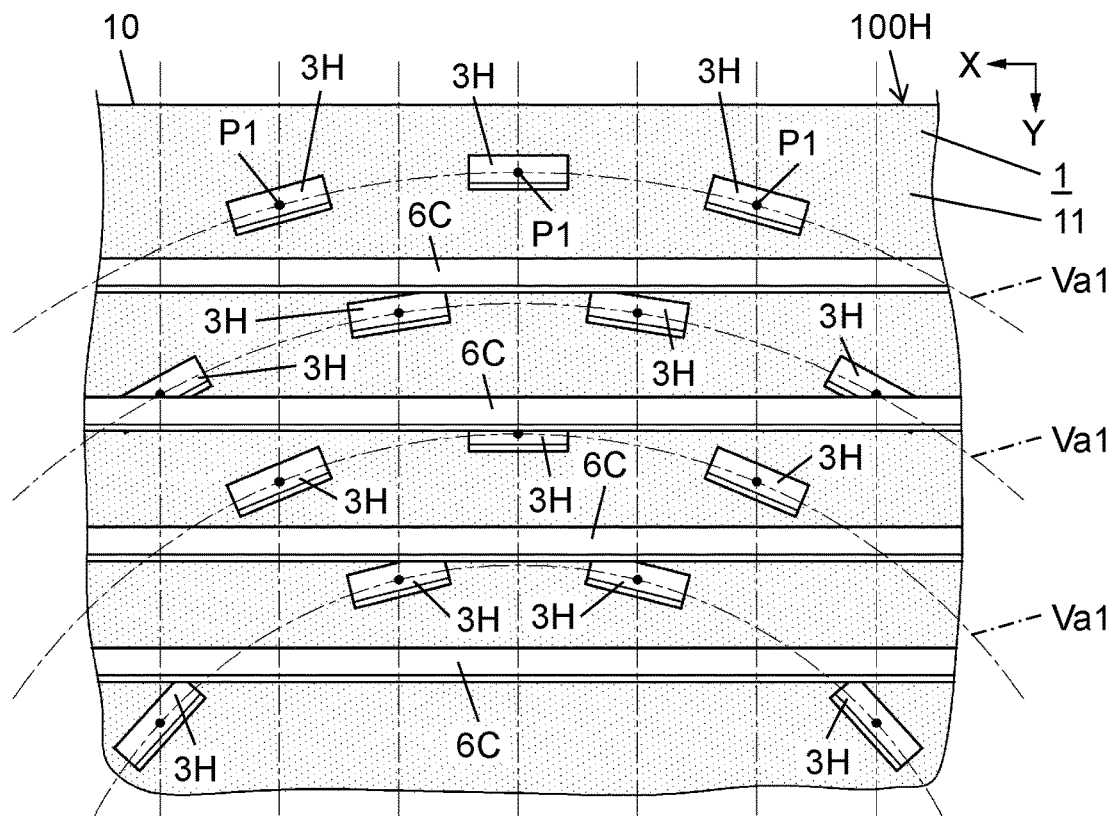
FIG. 15A is a schematic plan view of the optical system according to the modification example of Exemplary Embodiment 3.

As illustrated in FIG. 15A, optical system 100H according to still another modification example of Exemplary Embodiment 3 differs from optical system 100E according to Exemplary Embodiment 3 in that a plurality of prism pieces 3I1 are disposed on virtual arc Va1. That is, in the present modification example, as described in Exemplary Embodiment 1, a plurality of prism pieces 3I1 disposed on virtual arc Va1 and a long prism 6C are combined. In the example of FIG. 15A, the plurality of prism pieces 3I1 and long prism 6C are formed so as to partially overlap each other.

Figure 15B:
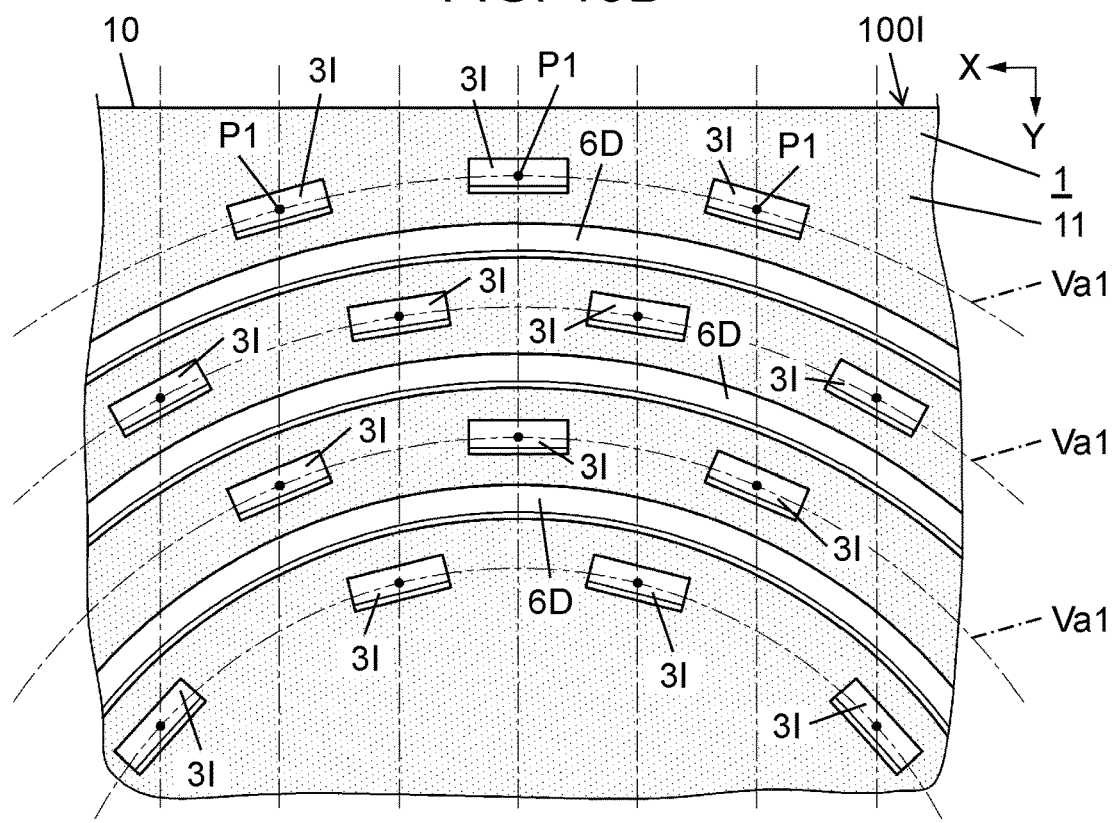
FIG. 15B is a schematic plan view of the optical system according to the modification example of Exemplary Embodiment 3.

As illustrated in FIG. 15B, optical system 100I according to still another modification example of Exemplary Embodiment 3 differs from optical system 100H of FIG. 15A in that a plurality of prism pieces 3I are disposed on the virtual arc Va1 and long prism 6D has an arc shape. That is, in the present modification example, as described in Exemplary Embodiment 1, the plurality of prism pieces 3I disposed on virtual arc Va1 and long prism 6D are combined.

As still another modification example of Exemplary Embodiment 3, long prism 6 is not limited to a linear shape or an arc shape when viewed from one side in the Z-axis direction, but may be formed in a free curve shape.

The various configurations (including the modification examples) described in Exemplary Embodiment 3 can be appropriately combined with the various configurations (including the modification examples) described in Exemplary Embodiment 1 or 2.

Exemplary Embodiment 4

Figure 16:
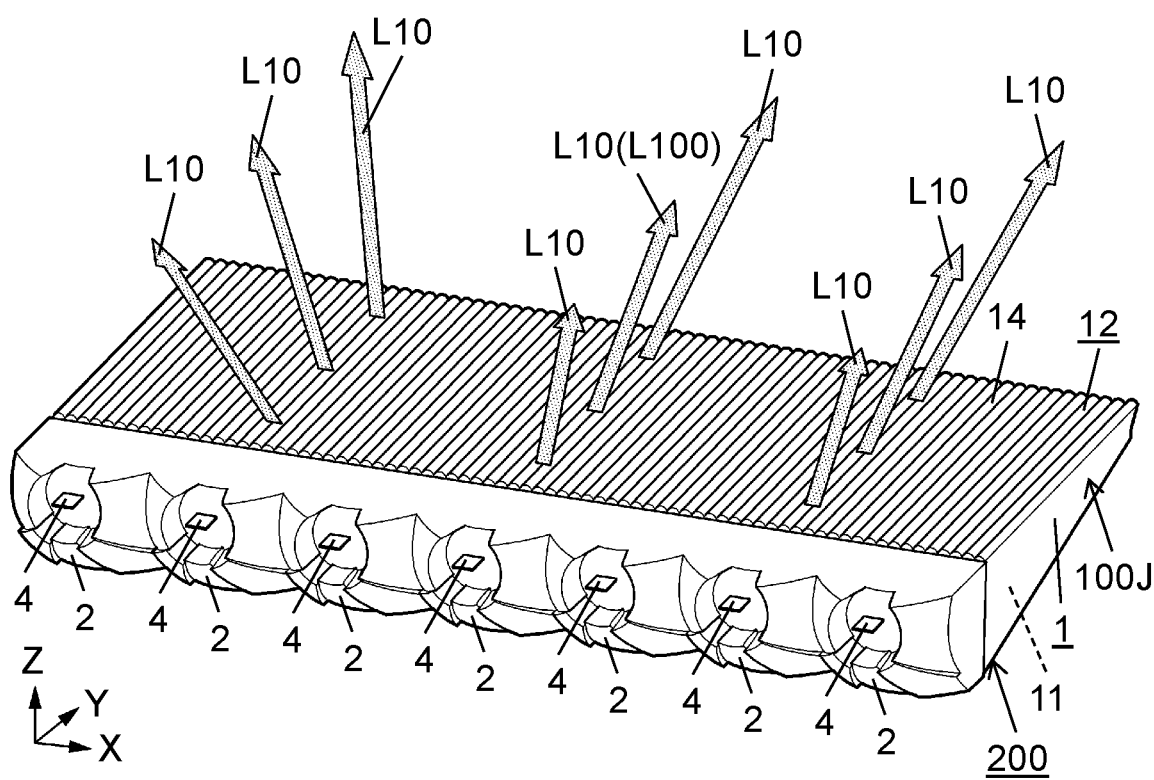
FIG. 16 is a perspective view illustrating an outline of an optical system according to Exemplary Embodiment 4.

As illustrated in FIG. 16, optical system 100J according to the present exemplary embodiment is different from optical system 100 according to Exemplary Embodiment 1 in that reference light beam L100 is inclined with respect to the normal line of second surface 12. Hereinafter, the same configurations as those in Exemplary Embodiment 1 are designated by common reference numerals, and the description thereof will be omitted as appropriate.

That is, in the present exemplary embodiment, reference light beam L100 is not a light beam perpendicular to second surface 12, but a light beam inclined with respect to the normal line of second surface 12. In the present exemplary embodiment, as an example, as illustrated in FIG. 16, a light beam (light L10) emitted from the vicinity of the center (central portion) in the first direction (X-axis direction), or more strictly, light beam (light L10) emitted from the center of second surface 12 is referred to as reference light beam L100. In the example of FIG. 16, reference light beam L100 is a light beam inclined in the positive direction of the X-axis with respect to the normal line of second surface 12. Light L10 is emitted from both end portions of second surface 12 in the first direction so as to face the outside in the first direction with respect to this reference light beam L100.

For example, as described in Exemplary Embodiment 1, when optical system 100J is applied to the head-up display mounted on moving object B1, such a light distribution (brightness distribution) may be required. That is, in the head-up display, for example, in order to prevent ambient light such as sunlight from being reflected by display surface 312 (see FIG. 4) and entering the eyes of user U1 (see FIG. 5), display surface 312 may be disposed at an angle with respect to the optical axis of virtual image E1 (see FIG. 5). In such a case, it is preferable that reference light beam L100 emitted from the center of second surface 12 corresponding to the center of display surface 312 is also a light beam inclined with respect to the normal line of second surface 12. In this case, it is preferable that reference light beam L100 is inclined not only in the Y-axis direction but also in the two-axis directions of the X-axis direction and the Y-axis direction with respect to the normal line of second surface 12.

Figure 17A:
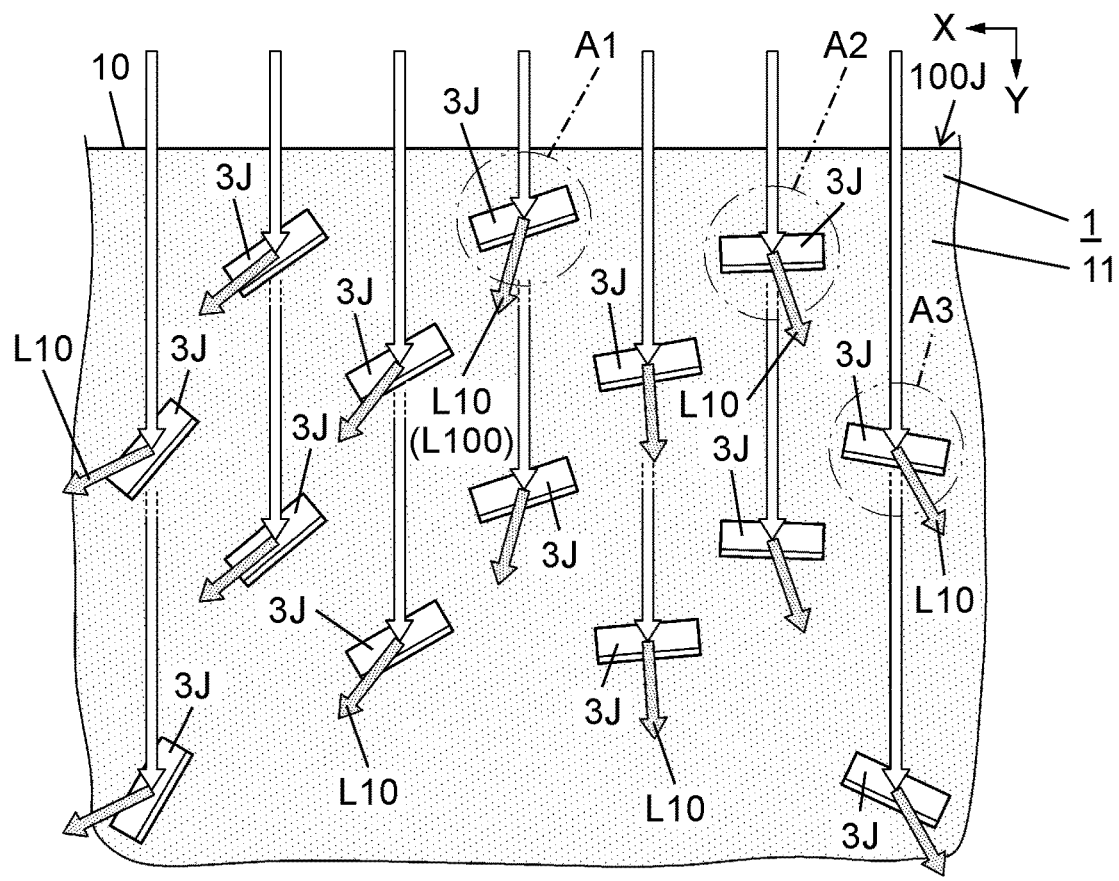
FIG. 17A is a schematic plan view of the same optical system.
Figure 17B:
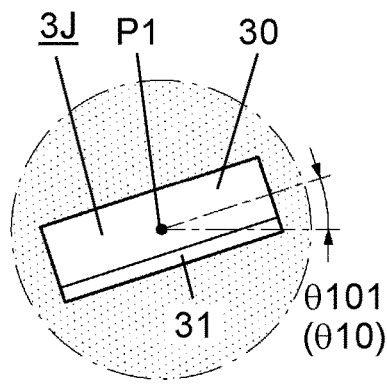
FIG. 17B is a schematic plan view of enlarged area A1 of FIG. 17A.
Figure 17C:
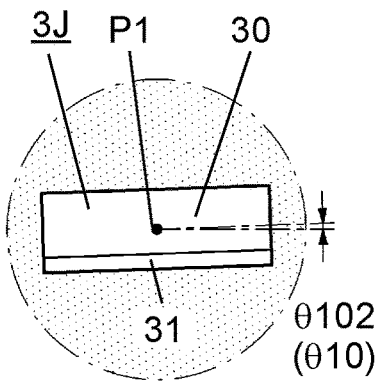
FIG. 17C is a schematic plan view of enlarged area A2 of FIG. 17A.
Figure 17D:
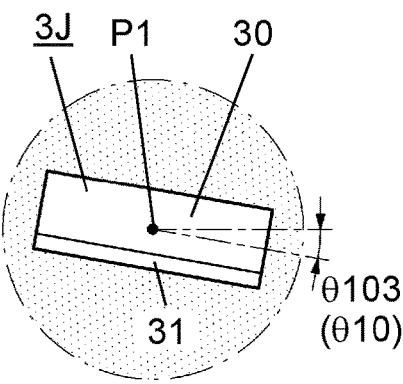
FIG. 17D is a schematic plan view of enlarged area A3 of FIG. 17A.

As illustrated in FIG. 17A, optical system 100J according to the present exemplary embodiment includes a plurality of prism pieces 3J disposed on an arc (virtual arc Va1) in a plan view (viewed from one side in the Z-axis direction) as in Exemplary Embodiment 1. As illustrated in FIGS. 17A to 17D, as these plurality of prism pieces 3J are positioned closer to both ends of first surface 11 in the first direction, that is, closer to the outside in the X-axis direction, the inclination of prism piece 3J positioned at the center in the first direction with respect to inclination angle θ10 (θ101) becomes larger. FIGS. 17B, 17C, and 17D are schematic plan views of enlarged areas A1, A2, and A3 of FIG. 17A, respectively.

More specifically, even in prism piece 3J positioned at the center in the first direction, inclination angle θ10 with respect to incident surface 10 is not 0 degree but has a certain size. Focusing on two prism pieces 3J adjacent to each other in the first direction (X-axis direction), one prism piece 3J positioned on the right side with respect to the other prism piece 3J has a shape in which the other prism piece 3J is rotated clockwise around representative point P1. That is, when prism piece 3J positioned at the center in the first direction is used as a reference, the farther away from the center in the first direction (X-axis direction), the larger the difference in the inclination angles θ10 from a reference prism piece 3J.

Inclination angle θ10 when prism piece 3J having inclination angle θ10 of 0 degree is rotated clockwise around representative point P1 is defined as a positive angle, and inclination angle θ10 when prism piece 3J having inclination angle θ10 of 0 degree is rotated counterclockwise around representative point P1 is defined as a negative angle. That is, inclination angle θ10 increases as prism piece 3J rotates clockwise, and inclination angle θ10 decreases as prism piece 3J rotates counterclockwise. In the present exemplary embodiment, in the prism piece 3J positioned at the center of first surface 11 in the first direction (X-axis direction), as illustrated in FIG. 17B (area A1 of FIG. 17A), inclination angle θ10 is not 0 degree but first angle θ101 which is a negative angle. With the center in the first direction as a first row, in prism piece 3J positioned in the third row counting from the center, as illustrated in FIG. 17C (area A2 in FIG. 17A), inclination angle θ10 becomes second angle θ102 that is larger than the first angle θ101. Further, in prism pieces 3J positioned in the fourth row counting from the center in the first direction, as illustrated in FIG. 17D (area A3 of FIG. 17A), inclination angle θ10 becomes third angle θ103 that is larger than second angle θ102. That is, first angle θ101, second angle θ102, and third angle θ103 have a relationship of "θ101<θ102<θ103".

In short, in the present exemplary embodiment, inclination angle θ of prism piece 3J is not necessarily smaller toward the center in the X-axis direction and not larger toward the outside in the X-axis direction. When prism piece 3J positioned at the center in the first direction is used as a reference, the farther away from the center in the first direction (X-axis direction), the larger the difference in inclination angles θ10 from reference prism piece 3J. That is, as the distance from the center in the first direction (X-axis direction) increases, inclination angle θ10 of prism piece 3J gradually increases in one direction (clockwise or counterclockwise).

Due to the arrangements of the plurality of prism pieces 3J as described above, light as parallel light incident on incident surface 10 is reflected by prism piece 3J toward the outside in the first direction with respect to reference light beam L100 as the prism piece is positioned closer to both ends in the first direction (X-axis direction). That is, the reflection direction of light on prism piece 3J is determined according to inclination angle θ10 with respect to incident surface 10 of prism piece 3J, and therefore inclination angle θ10 of prism piece 3J becomes larger as the prism piece is positioned closer to both ends of first surface 11 in the first direction. Therefore, the light reflected by prism piece 3J is emitted from second surface 12 as an emitting surface toward the outside in the first direction with respect to reference light beam L100 as the prism piece 3J is positioned closer to the outside in the first direction.

As a modification example of Exemplary Embodiment 4, the plurality of prism pieces 3J may be disposed on the grid points of virtual grid Vg1 (see FIG. 17A) on first surface 11.

The various configurations (including the modification examples) described in Exemplary Embodiment 4 can be appropriately combined with the various configurations (including the modification examples) described in Exemplary Embodiments 1 to 3.

SUMMARY

It is an object of the present disclosure to provide an optical system, a lighting system, a display system and a moving object which can easily realize a desired brightness distribution.

The optical systems (100, 100A to 100I) according to a first aspect of the present disclosure includes a light guide member (1) and a plurality of prism pieces (3, 3A to 3I). The light guide member (1) has an incident surface (10) on which light is incident, and a first surface (11) and a second surface (12) facing each other, and the second surface (12) is a light-emitting surface. The plurality of prism pieces (3, 3A to 3I) are provided on the first surface (11) and reflect the light passing through the inside of the light guide member (1) toward the second surface (12). The plurality of prism pieces (3, 3A to 3I) include two or more prism pieces (3, 3A to 3I) having different inclination angles (θ10) with respect to the incident surface (10) depending on the position in at least the first direction along both the incident surface (10) and the first surface (11). The inclination angles (θ10) of two or more prism pieces (3, 3A to 3I) are determined so that the light emitted from the second surface (12) is directed to the outside or the inside in the first direction with respect to the reference light beam (L100) as the plurality of prism pieces (3, 3A to 3I) are positioned closer to both ends of the first surface (11) in the first direction.

According to the present disclosure, there is an advantage that a desired brightness distribution can be easily realized. Specifically, according to the first aspect, the light incident from the incident surface (10) passes through the inside of the light guide member (1), reflected by the plurality of prism pieces (3, 3A to 3I) provided on the first surface (11) of the light guide member (1), and emitted from the second surface (12) as an emitting surface of the light guide member (1). Two or more prism pieces (3, 3A to 3I) among the plurality of prism pieces (3, 3A to 3I) have different inclination angle (θ10) with respect to the incident surface (10) depending on the position at least in the first direction and control the direction of the light emitted from the second surface (12) by the inclination angles (θ10). The inclination angle (θ10) is determined so that the light emitted from the second surface (12) is directed to the outside or the inside of the first direction with respect to the reference light beam (L100) as the prism pieces (3, 3A to 3I) are positioned closer to both ends of the first surface (11) in the first direction. Therefore, the light emitted from the second surface (12) as an emitting surface is not emitted in a uniform direction from the entire area of the second surface (12), but is emitted toward the outside or the inside at least at position closer to both ends of the second surface (12) in the first direction. As a result, there is an advantage that the brightness distribution on second surface (12) as an emitting surface can be adjusted by the inclination angles (θ10) of the plurality of prism pieces (3, 3A to 3I), and a desired brightness distribution can be easily realized.

In the optical system (100, 100A to 100I) according to a second aspect, in the first aspect, the light guide member (1) includes a direct optical path (L1). The direct optical path (L1) is an optical path in which the light incident from the incident surface (10) is directly reflected by any prism pieces (3, 3A to 3I) of the plurality of prism pieces (3, 3A to 3I) and emitted from the second surface (12).

According to this aspect, it is possible to improve the efficiency of light extraction.

In the optical system (100, 100A to 100I) according to a third aspect, in the first or second aspect, the plurality of prism pieces (3, 3A to 3I) include a first set and a second set. The first set consists of two prism pieces (3, 3A to 3I) adjacent to each other in the first direction. The second set is positioned farther from the center of the first surface (11) in the first direction than the first set and consists of two prism pieces (3, 3A to 3I) adjacent to each other in the first direction. The pitch in the first direction is the same for the first set and the second set.

According to this aspect, it is possible to reduce the light reflection loss due to the pitch deviation in the first direction of the plurality of prism pieces (3, 3A to 3I).

In the optical system (100, 100A to 100I) according to a fourth aspect, in the third aspect, among the plurality of prism pieces (3, 3A to 3I), the pitches of the two prism pieces (3, 3A to 3I) adjacent to each other in the first direction, in the first direction are the same for all of the plurality of prism pieces (3, 3A to 3I).

According to this aspect, it is possible to reduce the light reflection loss due to the pitch deviation in the first direction of the plurality of prism pieces (3, 3A to 3I).

In the optical system (100, 100A to 100I) according to a fifth aspect, in any of the first to fourth aspects, the plurality of prism pieces (3, 3A to 3I) are disposed on the virtual arc (Va1) on the first surface (11).

According to this aspect, it is easy to design the arrangement of the plurality of prism pieces (3, 3A to 3I).

In the optical system (100, 100A to 100I) according to a sixth aspect, in the fifth aspect, the plurality of prism pieces (3, 3A to 3I) include a third set and a fourth set. The third set consists of two prism pieces (3, 3A to 3I) adjacent to each other on virtual arc (Va1). The fourth set is positioned farther from the center of the first surface (11) in the first direction than the third set and consists of two adjacent prism pieces (3, 3A to 3I) on virtual arc (Va1). In the third set and the fourth set, the fourth set has a wider pitch along virtual arc (Va1).

According to this aspect, it is possible to reduce the light reflection loss due to the pitch deviation in the first direction of the plurality of prism pieces (3, 3A to 3I).

In the optical system (100, 100A to 100I) according to a seventh aspect, in any of the first to fourth aspects, the plurality of prism pieces (3, 3A to 3I) are disposed on the grid points of the virtual grid (Vg1) on the first surface (11).

According to this aspect, it is easy to design the arrangement of the plurality of prism pieces (3, 3A to 3I).

In the optical system (100, 100A to 100I) according to an eighth aspect, in any one of the first to seventh aspects, the length of each of the plurality of prism pieces (3, 3A to 3I) is the same for all of the plurality of prism pieces (3, 3A to 3I).

According to this aspect, it is easy to design the arrangement of the plurality of prism pieces (3, 3A to 3I).

In the optical system (100, 100A to 100I) according to a ninth aspect, in any one of the first to seventh aspects, the length of each of the plurality of prism pieces (3, 3A to 3I) becomes larger as the prism piece is positioned closer to both ends of the first surface (11) in the first direction.

According to this aspect, it is possible to reduce the light reflection loss due to the pitch deviation in the first direction of the plurality of prism pieces (3, 3A to 3I).

In the optical system (100, 100A to 100I) according to a tenth aspect, in any one of the first to ninth aspects, the plurality of prism pieces (3, 3A to 3I) include two or more prism pieces (3, 3A to 3I) having different heights from the first surface (11).

According to this aspect, the light reflection loss due to the pitch variation of the plurality of prism pieces (3, 3A to 3I) can be reduced.

In the optical system (100, 100A to 100I) according to an eleventh aspect, in the tenth aspect, the height of each of the plurality of prism pieces (3, 3A to 3I) becomes larger as the prism piece is positioned closer to both ends in the first direction of the first surface (11).

According to this aspect, the light reflection loss due to the pitch variation of the plurality of prism pieces (3, 3A to 3I) can be reduced.

The optical system (100, 100A to 100I) according to a twelfth aspect further includes a long prism (6, 6A to 6D) in any one of the first to eleventh aspects. The long prisms (6, 6A to 6D) are disposed between the two prism pieces (3, 3A to 3I) adjacent to each other on the first surface (11) in the second direction orthogonal to the first direction, among the plurality of prism pieces (3, 3A to 3I). The long prisms (6, 6A to 6D) have a length extending over two or more prism pieces (3, 3A to 3I) adjacent to each other in the first direction.

According to this aspect, it is possible to reduce the light reflection loss due to the pitch deviation in the first direction of the plurality of prism pieces (3, 3A to 3I).

In the optical system (100, 100A to 100I) according to a thirteenth aspect, a plurality of long prisms (6, 6A to 6D) are provided in the twelfth aspect. The plurality of long prisms (6, 6A to 6D) have different lengths.

According to this aspect, it is possible to reduce the light reflection loss due to the pitch deviation in the first direction of the plurality of prism pieces (3, 3A to 3I).

In the optical system (100, 100A to 100I) according to a fourteenth aspect, in any one of the first to thirteenth aspects, light from a plurality of light sources (4) arranged in the first direction is incident on the incident surface (10).

According to this aspect, there is an advantage that a desired brightness distribution can be easily realized.

The lighting system (200) according to a fifteenth aspect includes the optical system (100, 100A to 100I) according to any one of the first to fourteenth aspects, and a light source (4) that outputs light incident on the incident surface (10).

According to this aspect, there is an advantage that a desired brightness distribution can be easily realized.

The display system (300) according to a sixteenth aspect includes the lighting system (200) according to the fifteenth aspect, and a display device (5) that displays an image by receiving the light emitted from the lighting system (200).

According to this aspect, there is an advantage that a desired brightness distribution can be easily realized.

The moving object (B1) according to a seventeenth aspect includes a display system (300) according to the sixteenth aspect and a moving object body (B11) on which the display system (300) is mounted.

According to this aspect, there is an advantage that a desired brightness distribution can be easily realized.

The configurations according to the second to fourteenth aspects are not essential configurations for the optical system (100, 100A to 100I) and can be omitted as appropriate.

What is claimed is:

1. An optical system comprising:
a light guide member having a light-incident surface, a first surface, a light-emitting surface facing the first surface, a first end surface, and a second end surface facing the first end surface;
a plurality of collimating lenses disposed on the light-incident surface and being arranged along a first direction, the first direction extending from the first end surface to the second end surface; and
a plurality of prism pieces provided on the first surface, the plurality of prism pieces being configured to reflect, toward the light-emitting surface, light passing through an inside of the light guide member, each of the prism pieces having a longitudinal axis,
wherein
the plurality of prism pieces include two or more prism pieces having different inclination angles with respect to the light-incident surface depending on positions of the prism pieces in at least the first direction, and each of the inclination angles of the two or more prism pieces is an angle formed between the first direction and the longitudinal axis of a corresponding prism piece,
each of the inclination angles of the two or more prism pieces increases as the corresponding prism piece is positioned closer to any of the first end surface or the second end surface,
the plurality of collimating lenses and the light guide member are integrally molded,
the plurality of prism pieces are disposed on a virtual arc on the first surface,
the plurality of prism pieces include a first set consisting of two prism pieces adjacent to each other on the virtual arc, and a second set consisting of two prism pieces positioned farther from a center of the first surface in the first direction than the first set and are adjacent to each other on the virtual arc, and
in the first set and the second set, the second set has a wider distance between adjacent prism pieces along the virtual arc.

2. The optical system of claim 1,
wherein the light guide member includes a direct optical path in which light incident from the light-incident surface is directly reflected by any one of the plurality of prism pieces and emitted from the light-emitting surface.

3. The optical system of claim 1,
wherein a length of each of the plurality of prism pieces is the same for all of the plurality of prism pieces.

4. The optical system of claim 1,
wherein a length of each of the plurality of prism pieces becomes larger as the prism piece is positioned closer to any of the first end surface or the second end surface.

5. A lighting system comprising:
the optical system according to claim 1; and
a plurality of light sources arranged in the first direction,
wherein light from the plurality of light sources is incident on the plurality of collimating lenses provided on the light-incident surface.

6. The optical system of claim 1,
wherein the plurality of prism pieces include a third set consisting of two prism pieces adjacent to each other in the first direction, and a fourth set consisting of two prism pieces positioned farther from a center of the first surface in the first direction than the third set and adjacent to each other in the first direction, and
wherein a distance between adjacent prism pieces among the plurality of prism pieces in the first direction is the same for the third set and the fourth set.

7. The optical system of claim 6,
wherein among the plurality of prism pieces, the distance in the first direction of the two prism pieces adjacent to each other in the first direction is the same for all of the plurality of prism pieces.

8. The optical system of claim 1,
wherein the plurality of prism pieces include two or more prism pieces having different heights from the first surface.

9. The optical system of claim 8,
wherein a height of each of the plurality of prism pieces becomes larger as the prism piece is positioned closer to any of the first end surface or the second end surface.

10. The optical system of claim 1, further comprising:
a long prism that is disposed between two prism pieces adjacent to each other on the first surface in a second direction orthogonal to the first direction, among the plurality of prism pieces and has a length extending over two or more prism pieces adjacent to each other in the first direction.

11. The optical system of claim 10,
wherein a plurality of long prisms each being the long prism are provided, and
the plurality of long prisms have different lengths.

12. A lighting system comprising:
the optical system according to claim 1; and
a light source that outputs the light incident on the incident surface.

13. A display system comprising:
the lighting system of claim 12; and
a display device that receives the light emitted from the lighting system and displays an image.

14. A moving object comprising:
the display system of claim 13; and
a moving object body that is equipped with the display system.

15. An optical system comprising:
a light guide member having a light-incident surface, a first surface, a light-emitting surface facing the first surface, a first end surface, and a second end surface facing the first end surface;
a plurality of collimating lenses disposed on the light-incident surface and being arranged along a first direction, the first direction extending from the first end surface to the second end surface; and
a plurality of prism pieces provided on the first surface, the plurality of prism pieces being configured to reflect, toward the light-emitting surface, light passing through an inside of the light guide member, each of the prism pieces having a longitudinal axis,
wherein
the plurality of prism pieces include two or more prism pieces having different inclination angles with respect to the light-incident surface depending on positions of the prism pieces in at least the first direction, and each of the inclination angles of the two or more prism pieces is an angle formed between the first direction and the longitudinal axis of a corresponding prism piece, and
each of the inclination angles of the two or more prism pieces causes the corresponding prism piece to reflect light toward the light-emitting surface such that light is emitted from the light-emitting surface at (i) an angle more inclined toward the first end surface as the corresponding prism piece is positioned closer to the first end surface and (ii) at an angle more inclined toward the second end surface as the corresponding prism piece is positioned closer to the second end surface.

\* \* \* \* \*